April 2, 1957 G. E. STILWELL 2,787,001
ATTACHMENT FOR BOX MAKING MACHINE
Filed Jan. 28, 1952 15 Sheets-Sheet 1

INVENTOR
GLENN E. STILWELL
BY Hans G. Hoffmeister
ATTORNEY

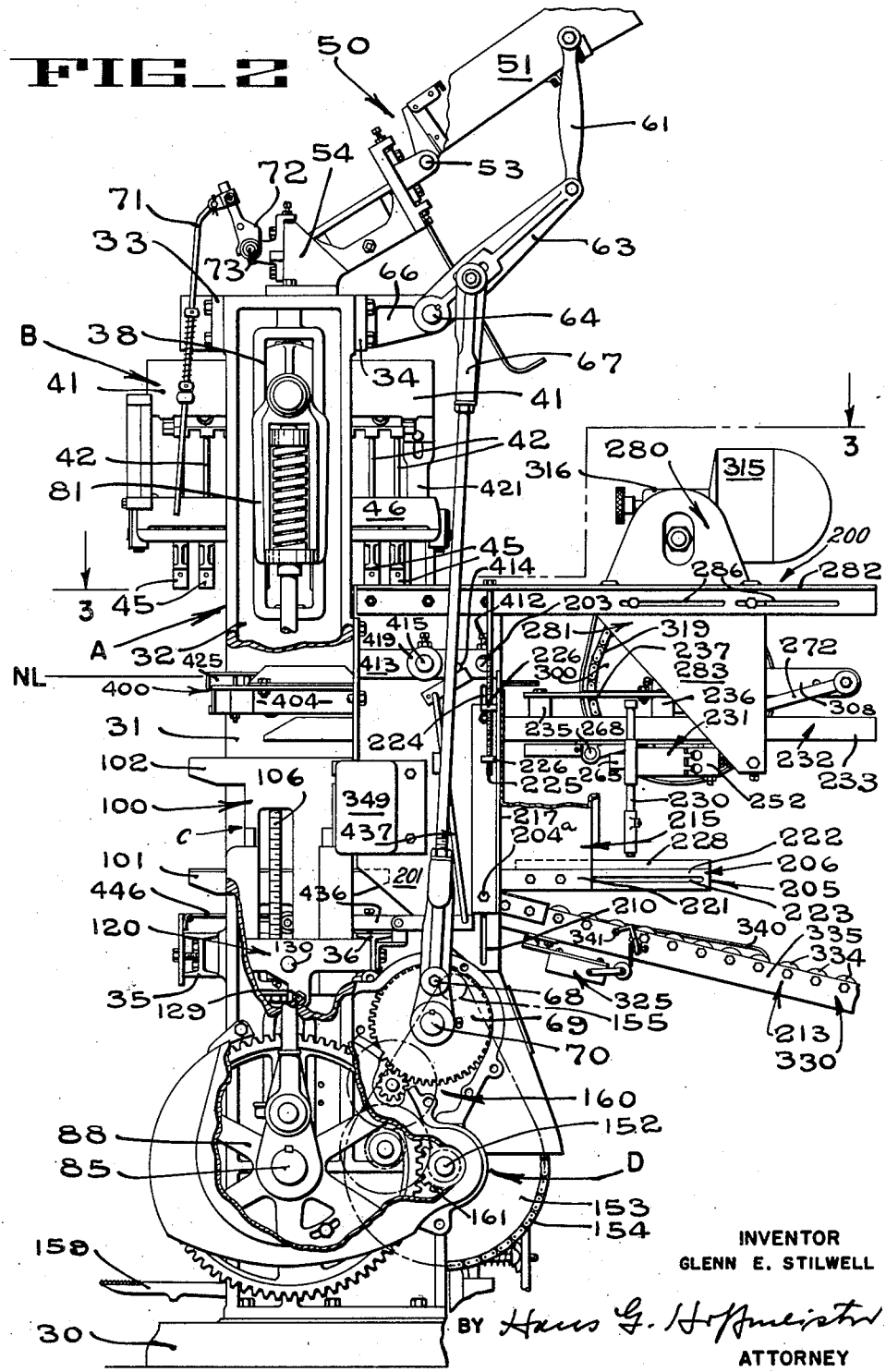

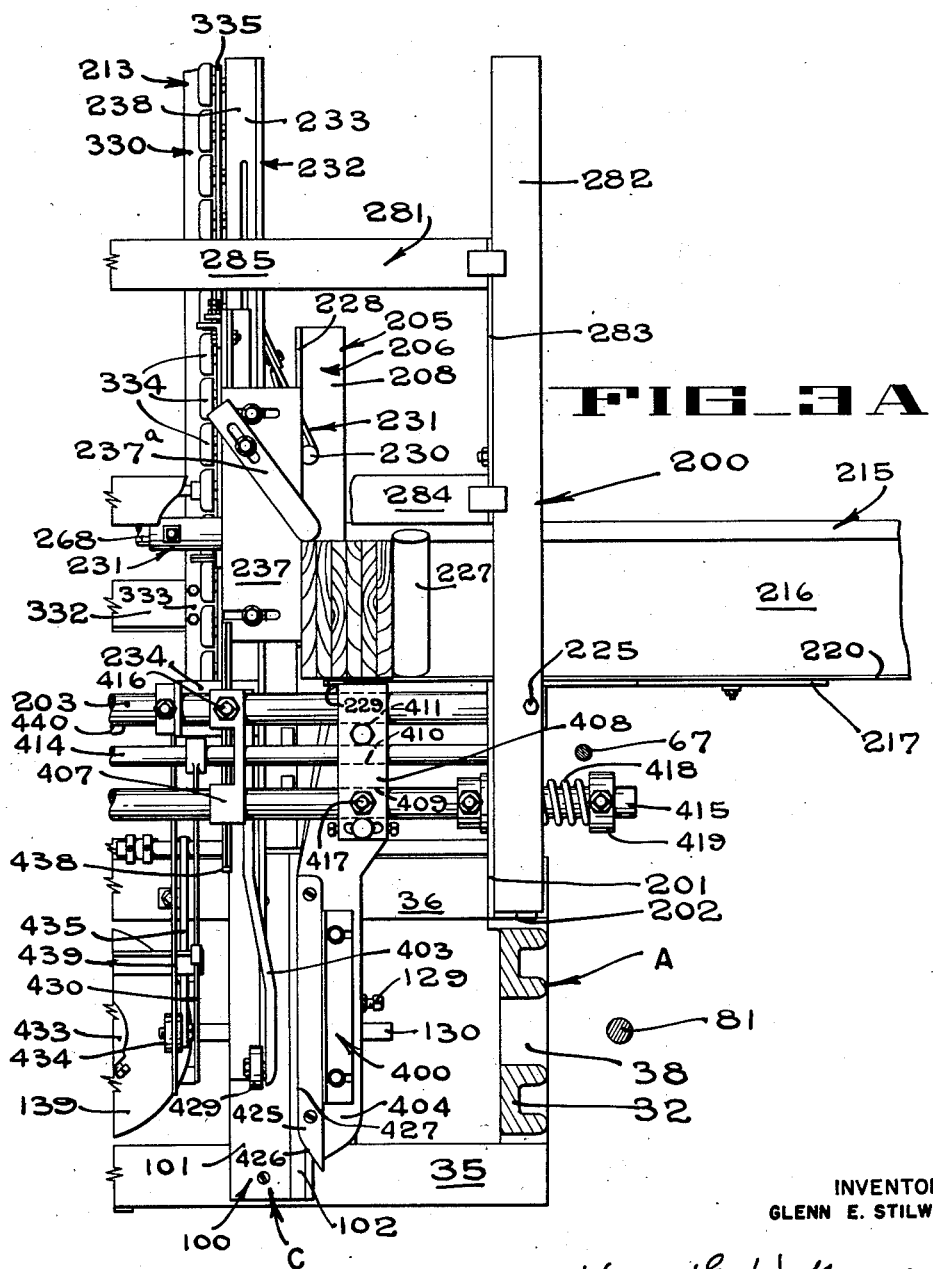

April 2, 1957 G. E. STILWELL 2,787,001
ATTACHMENT FOR BOX MAKING MACHINE
Filed Jan. 28, 1952 15 Sheets-Sheet 4
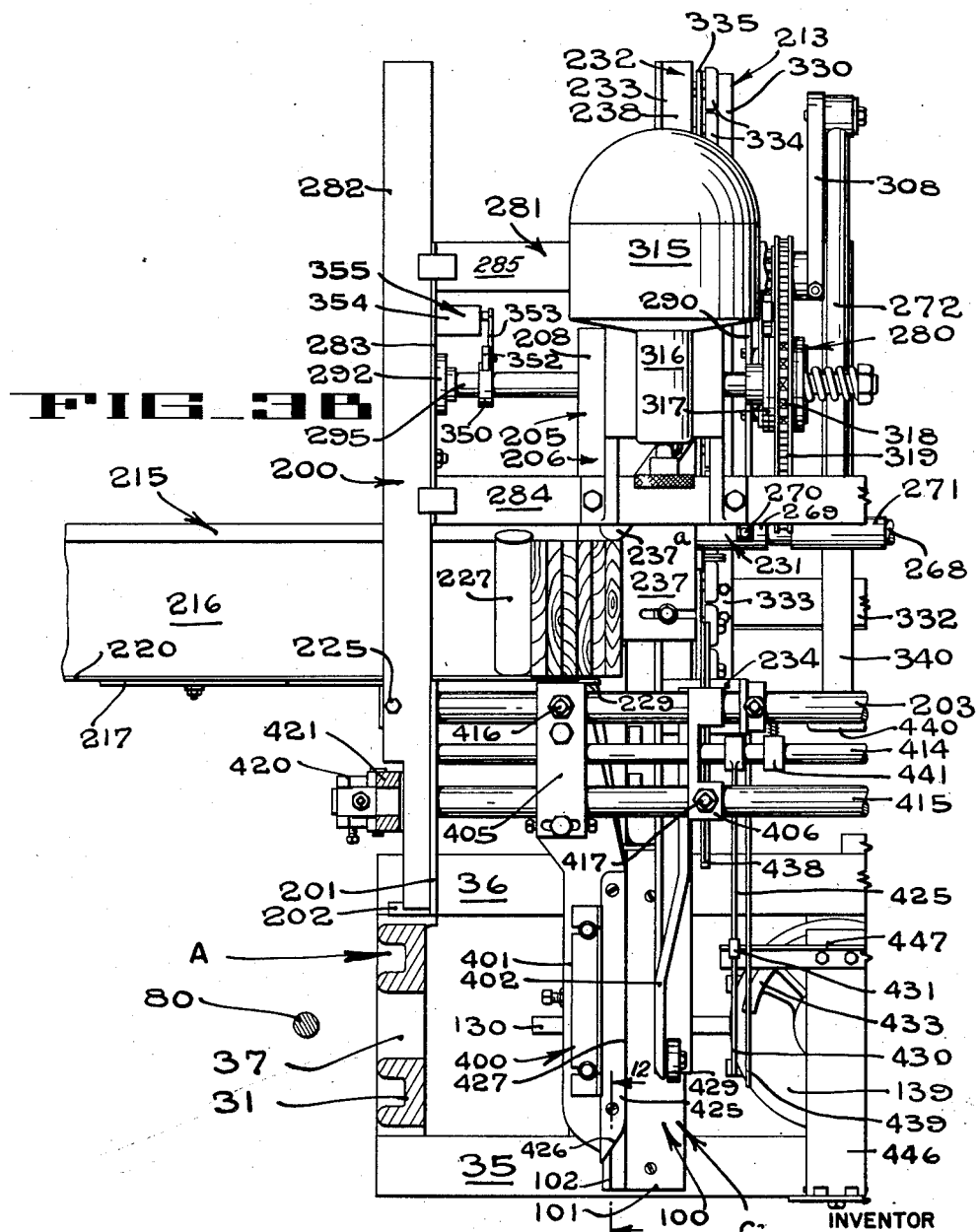

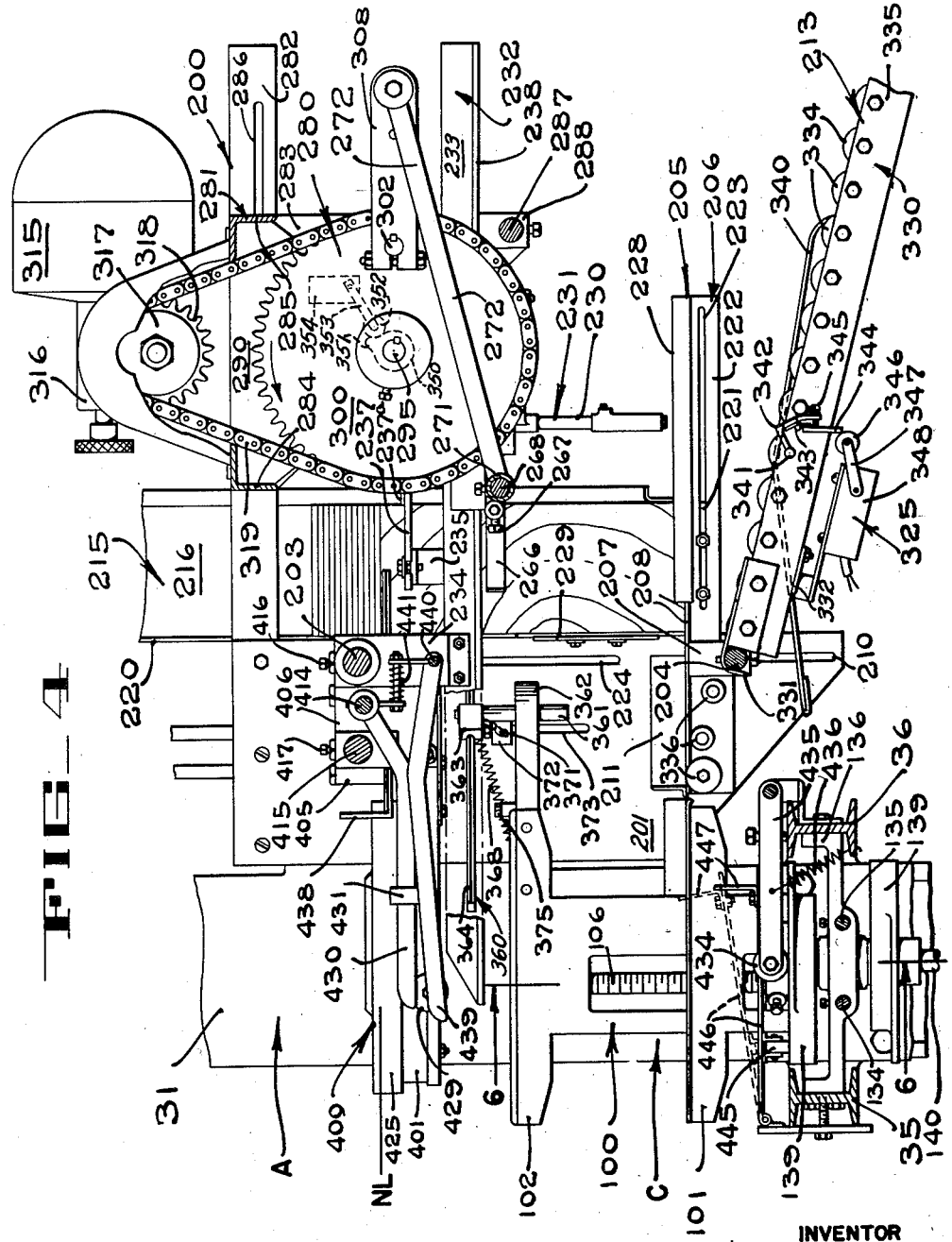

April 2, 1957  G. E. STILWELL  2,787,001
ATTACHMENT FOR BOX MAKING MACHINE
Filed Jan. 28, 1952  15 Sheets-Sheet 6
FIG_5
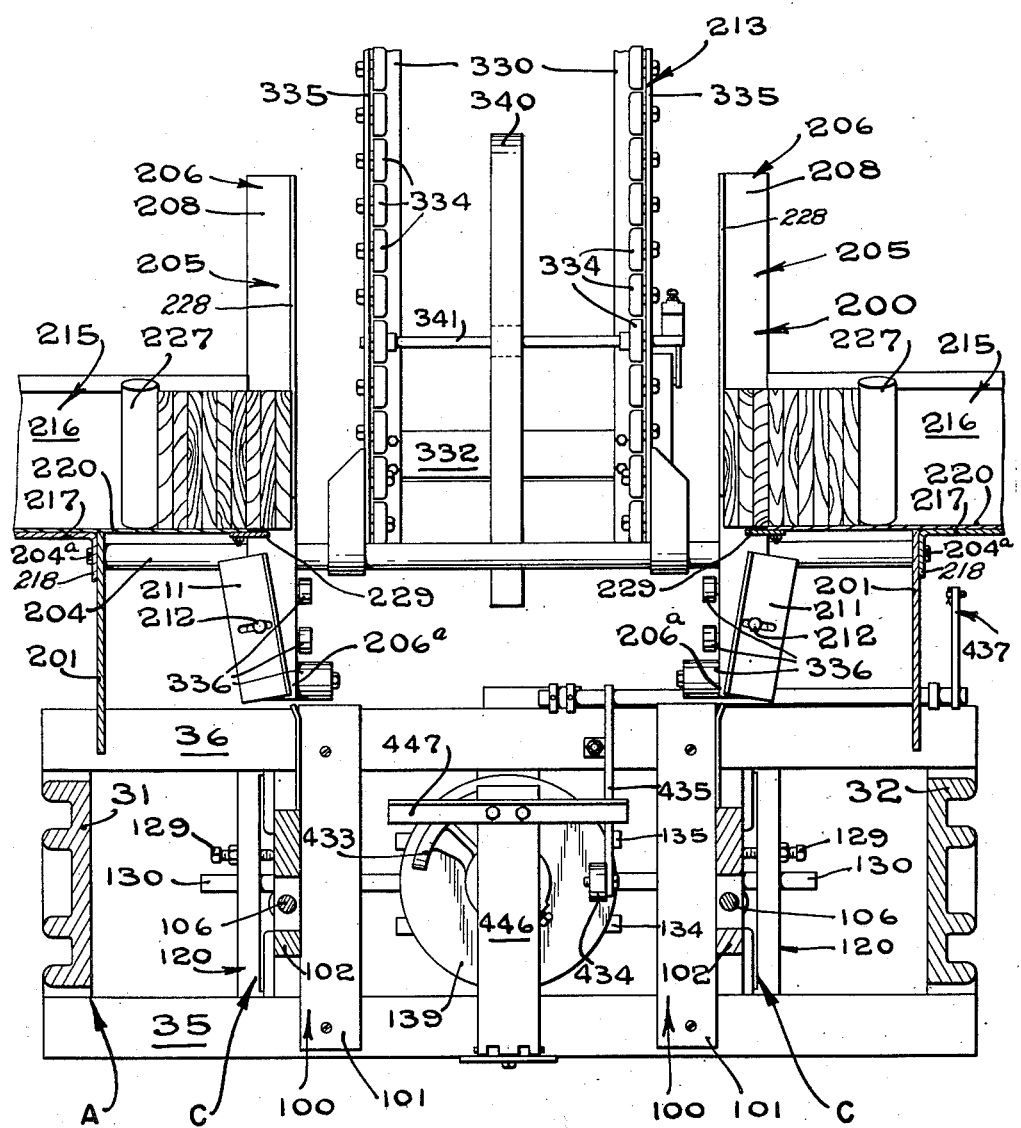
INVENTOR
GLENN E. STILWELL
BY
ATTORNEY

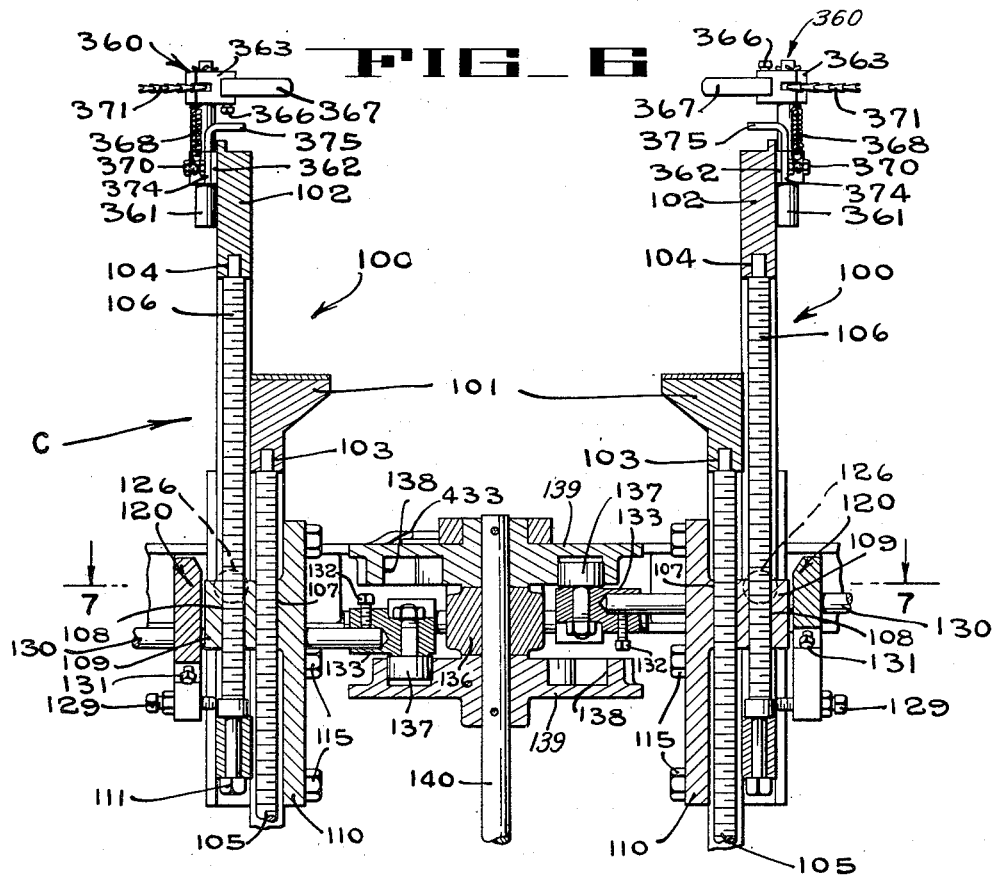
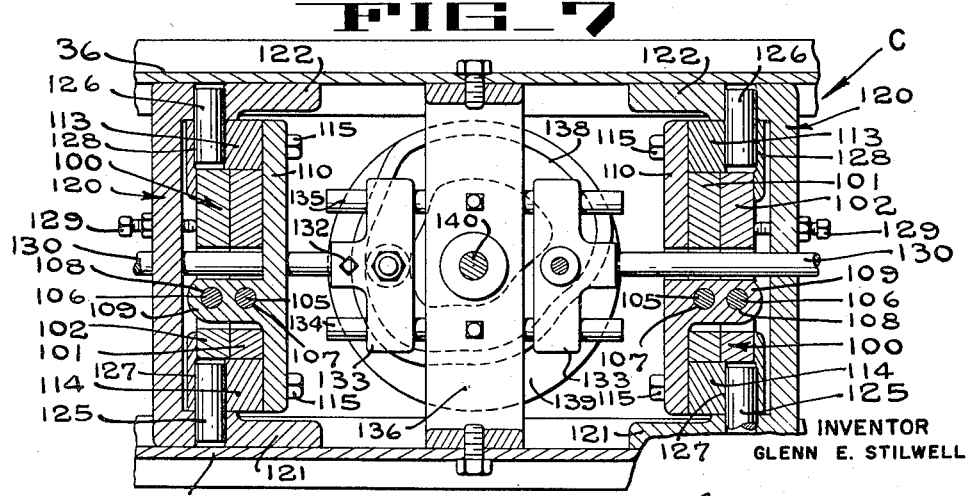

April 2, 1957  G. E. STILWELL  2,787,001
ATTACHMENT FOR BOX MAKING MACHINE
Filed Jan. 28, 1952  15 Sheets-Sheet 8
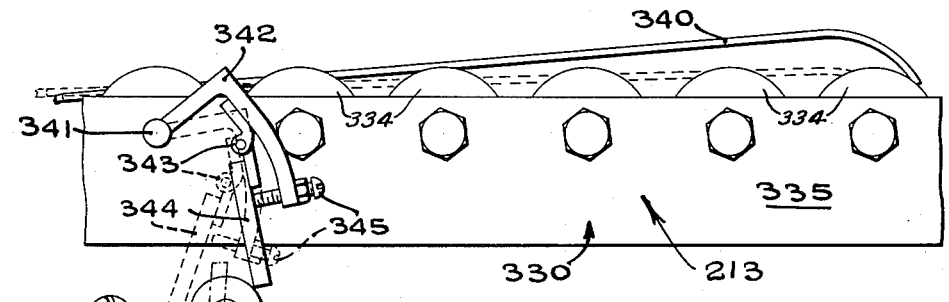
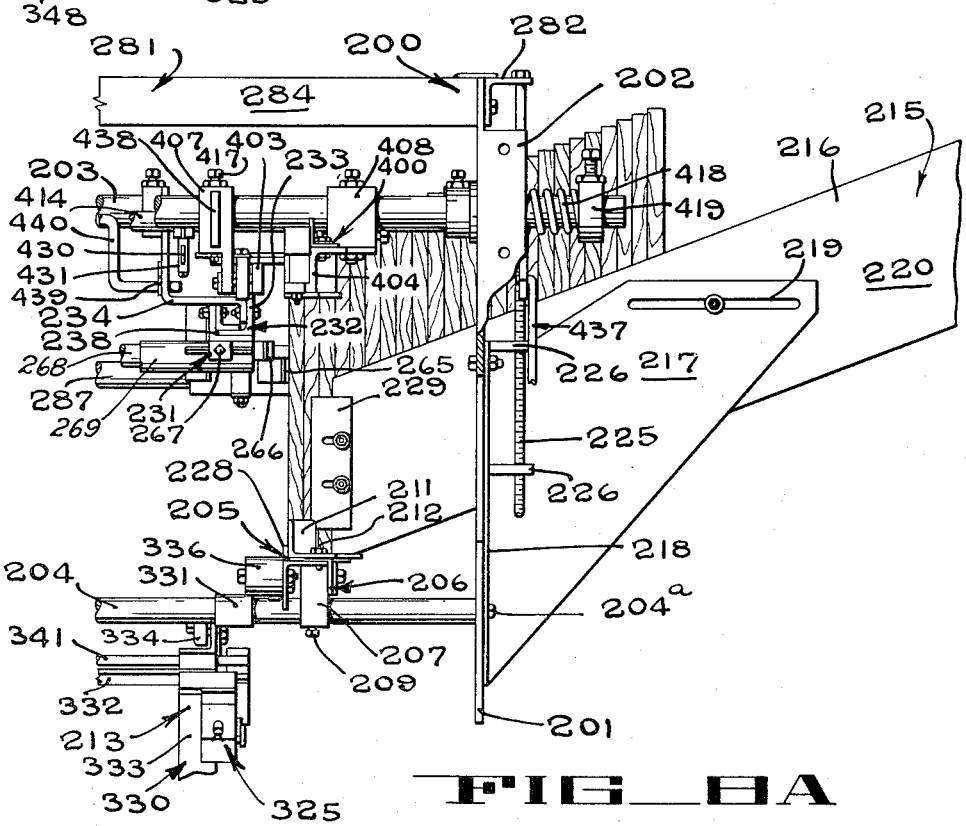
INVENTOR
GLENN E. STILWELL
BY Hans G. Hoffmeister
ATTORNEY

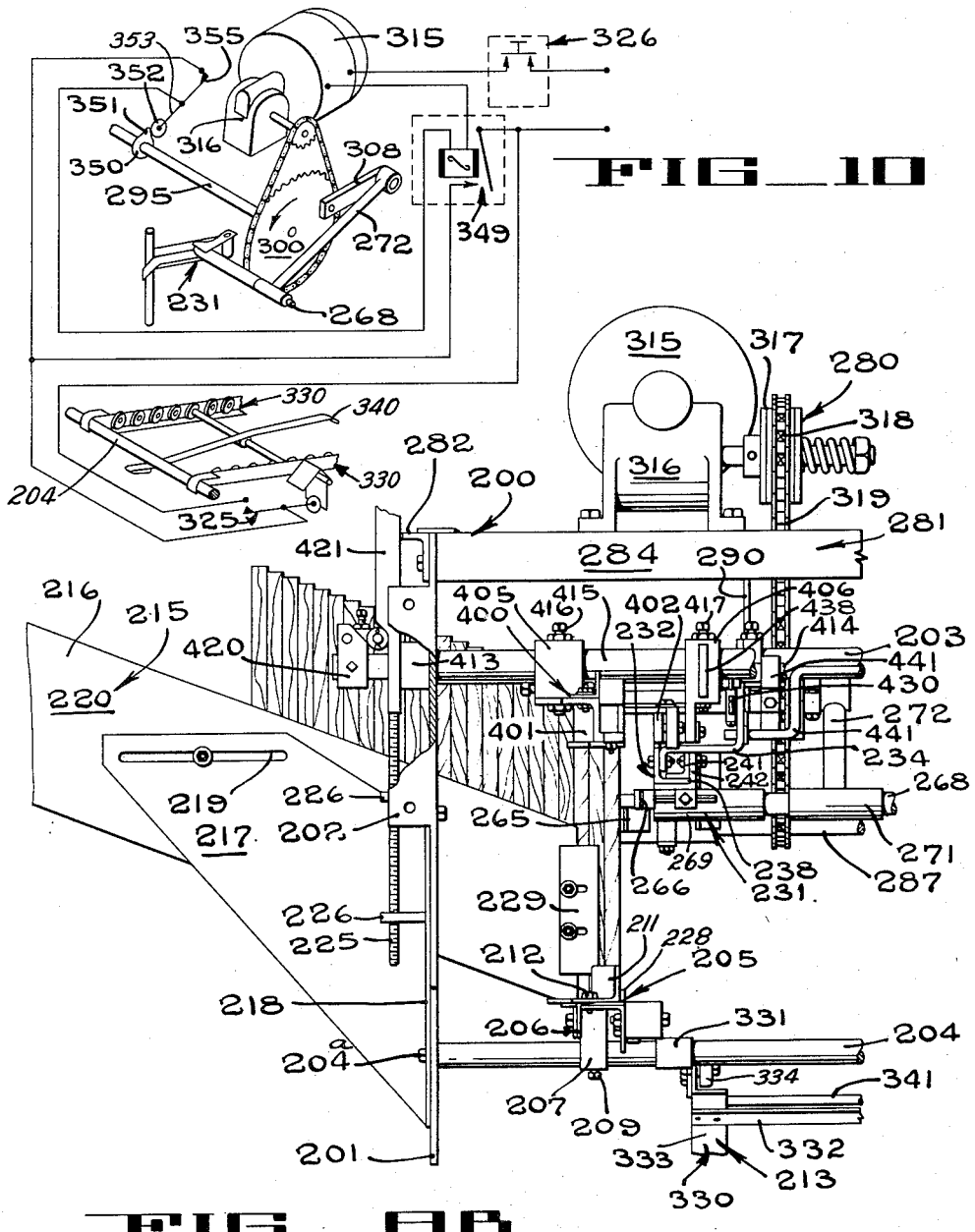

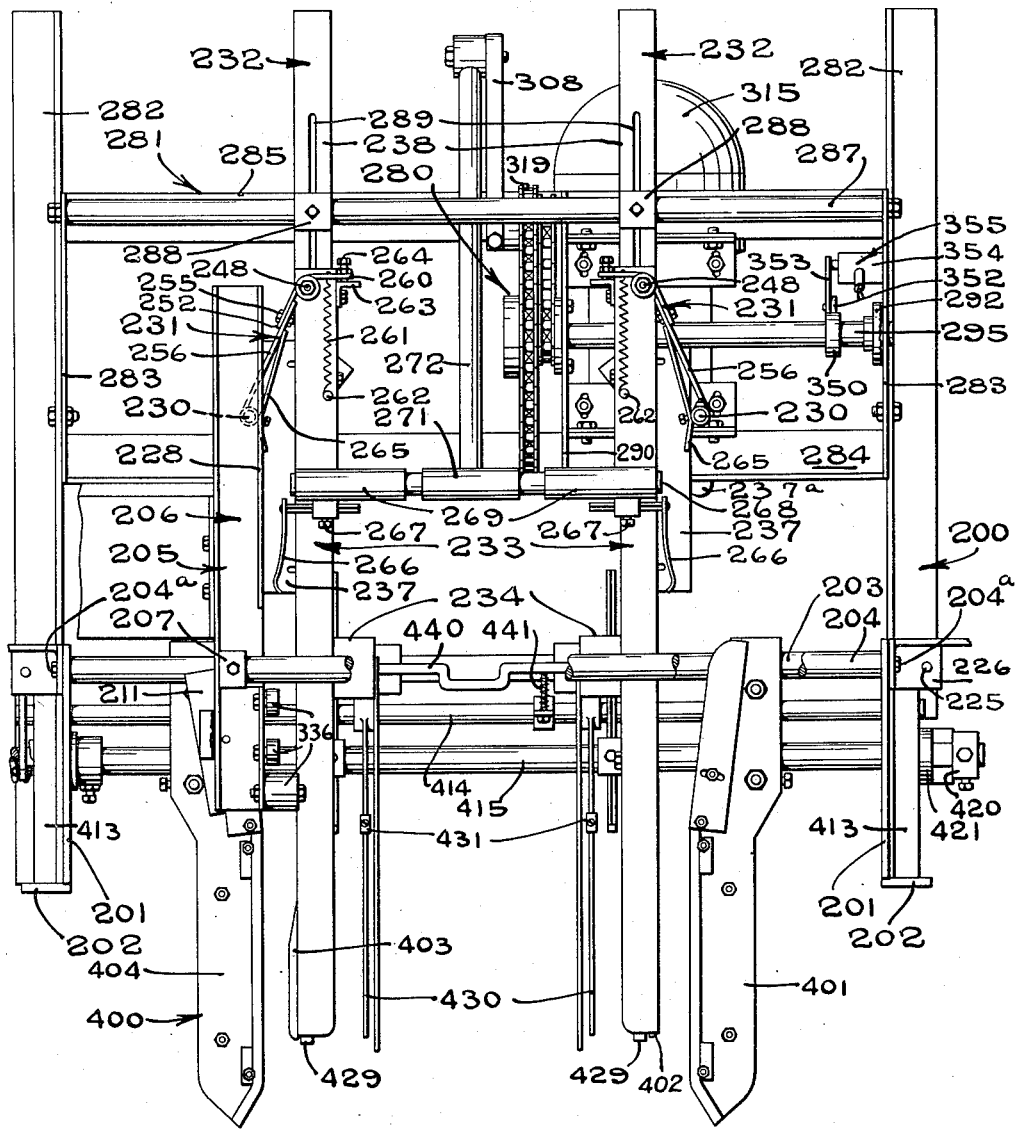
FIG_11
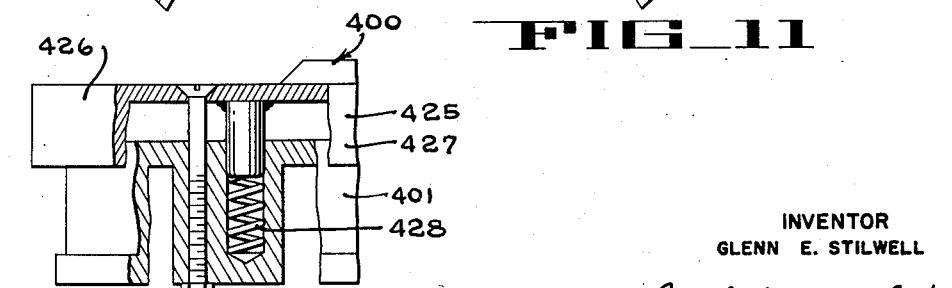
FIG_12
INVENTOR
GLENN E. STILWELL
BY Hans G. Hoffmeister
ATTORNEY

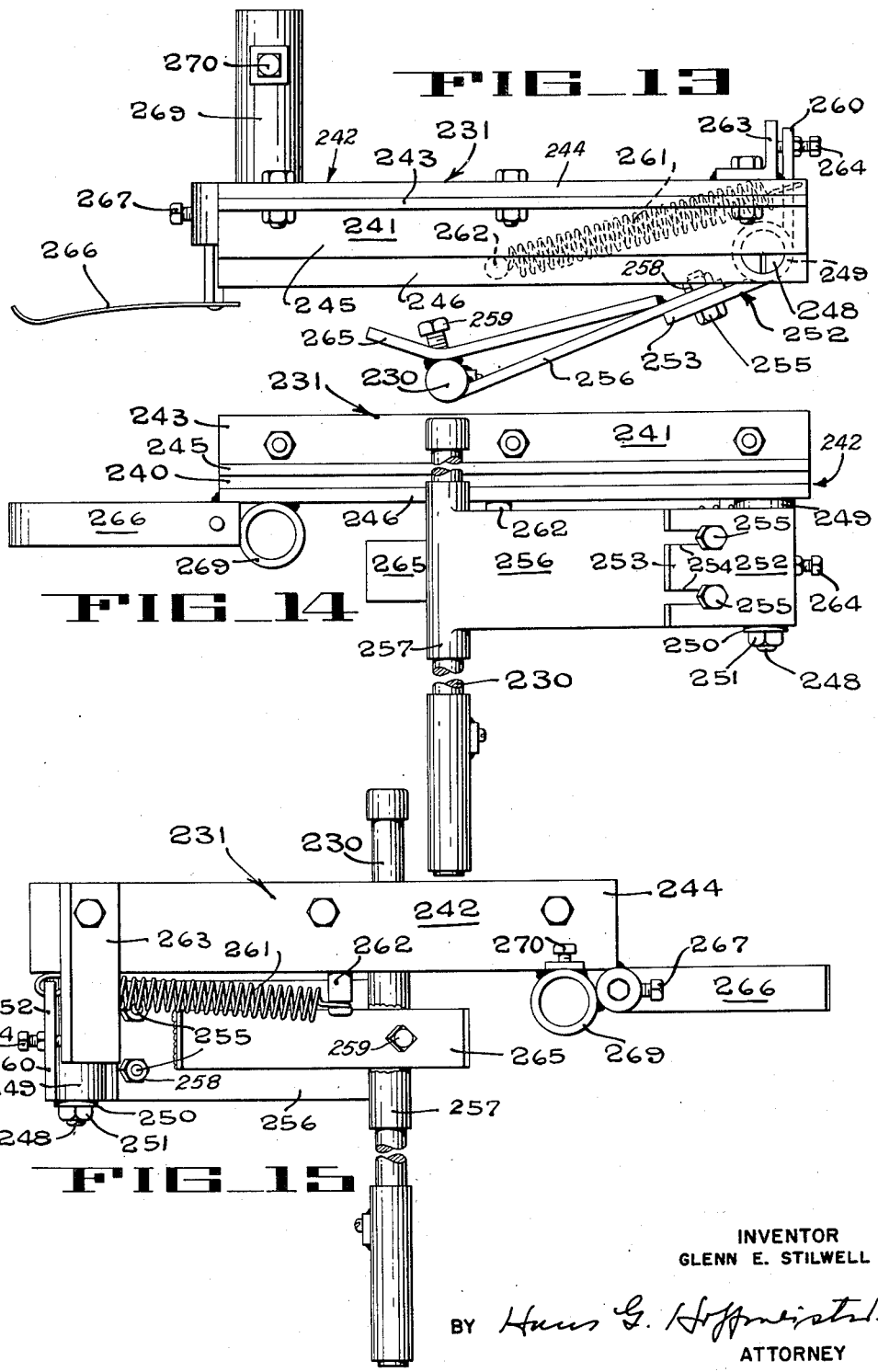

April 2, 1957 G. E. STILWELL 2,787,001
ATTACHMENT FOR BOX MAKING MACHINE
Filed Jan. 28, 1952 15 Sheets-Sheet 12
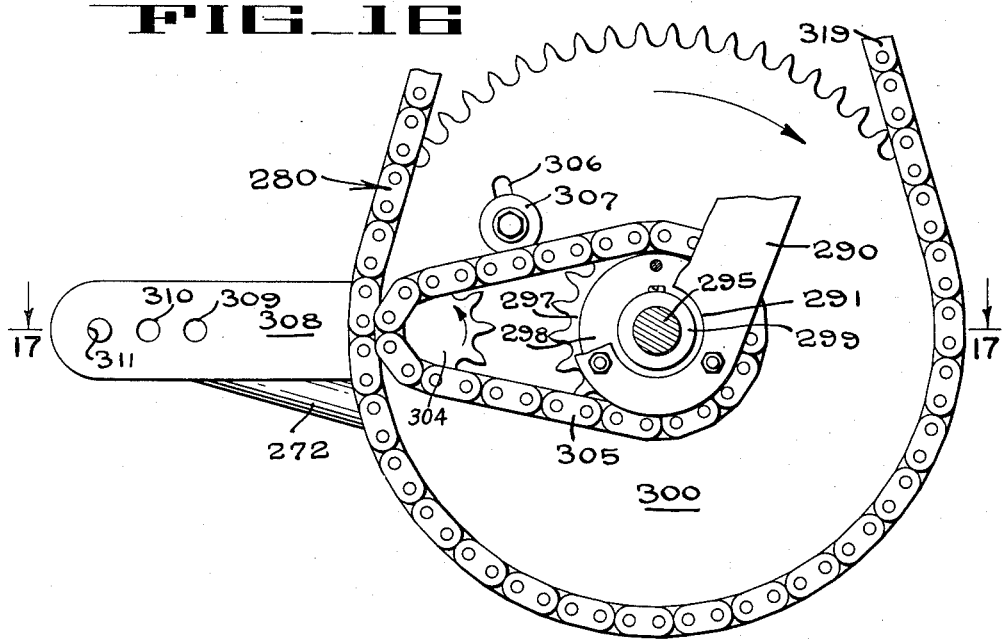
FIG_16
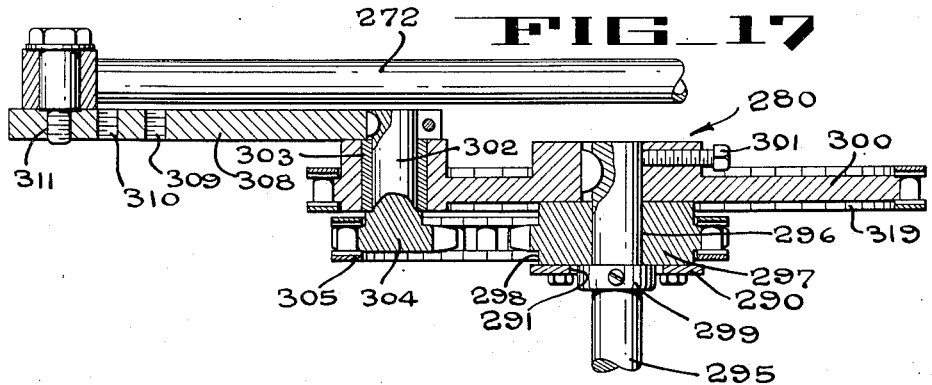
FIG_17
INVENTOR
GLENN E. STILWELL
BY *Hans G. Hoffmeister*
ATTORNEY April 2, 1957 G. E. STILWELL 2,787,001
ATTACHMENT FOR BOX MAKING MACHINE
Filed Jan. 28, 1952 15 Sheets-Sheet 13
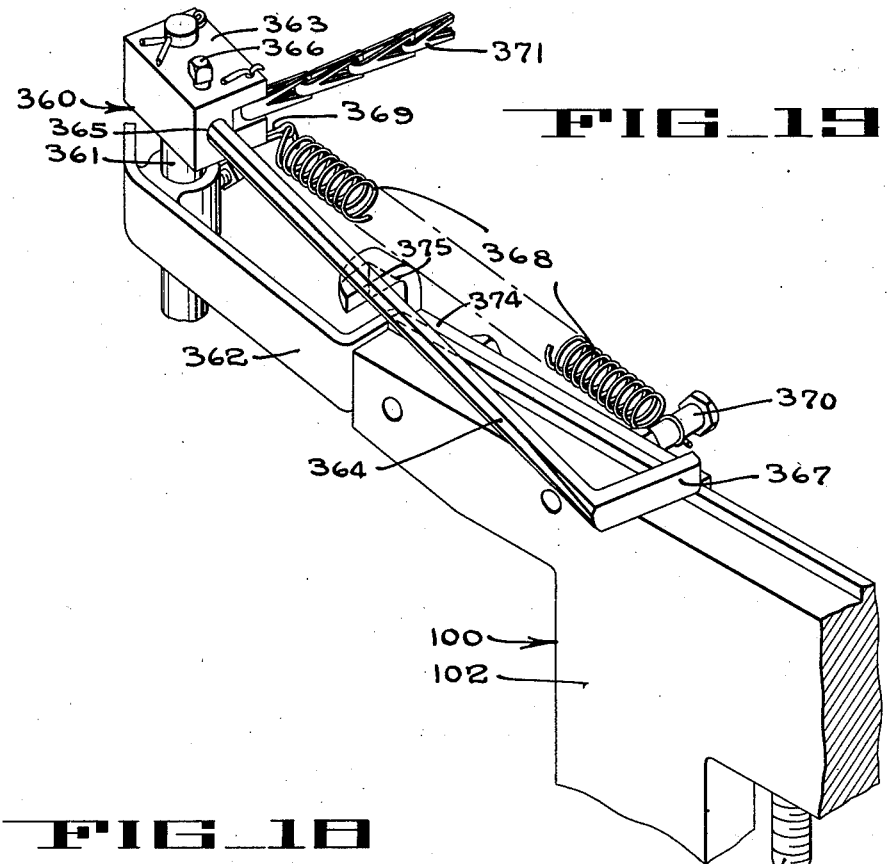
FIG_19
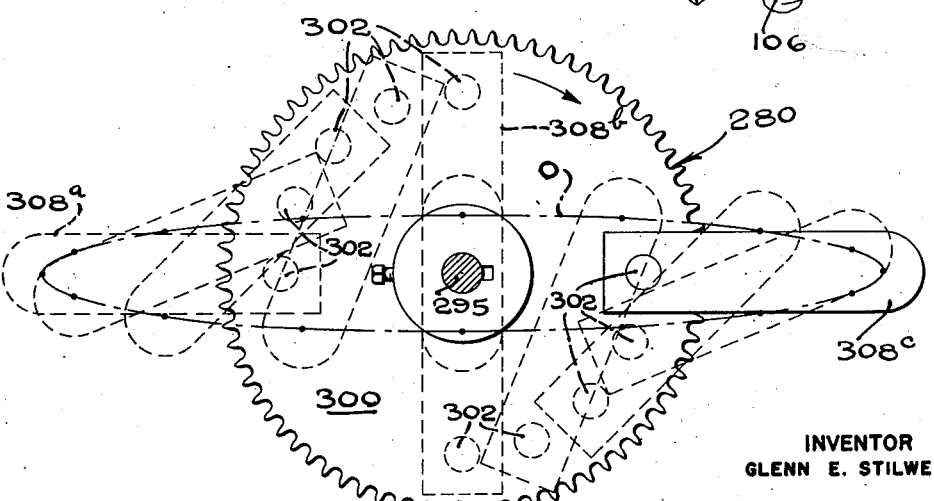
FIG_18
INVENTOR
GLENN E. STILWELL
BY Hans G. Hoffmeister
ATTORNEY

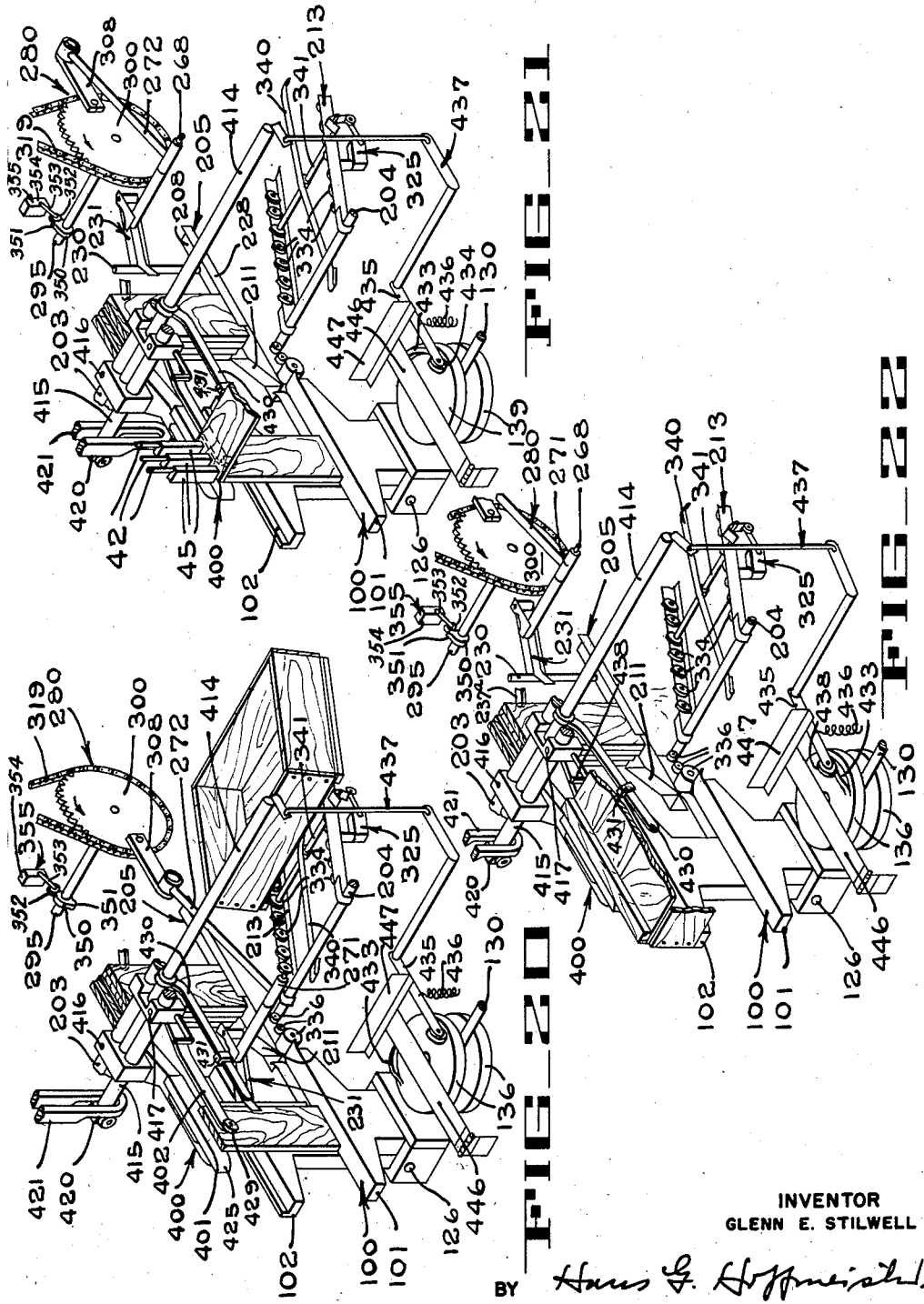

April 2, 1957 G. E. STILWELL 2,787,001
ATTACHMENT FOR BOX MAKING MACHINE
Filed Jan. 28, 1952 15 Sheets-Sheet 15
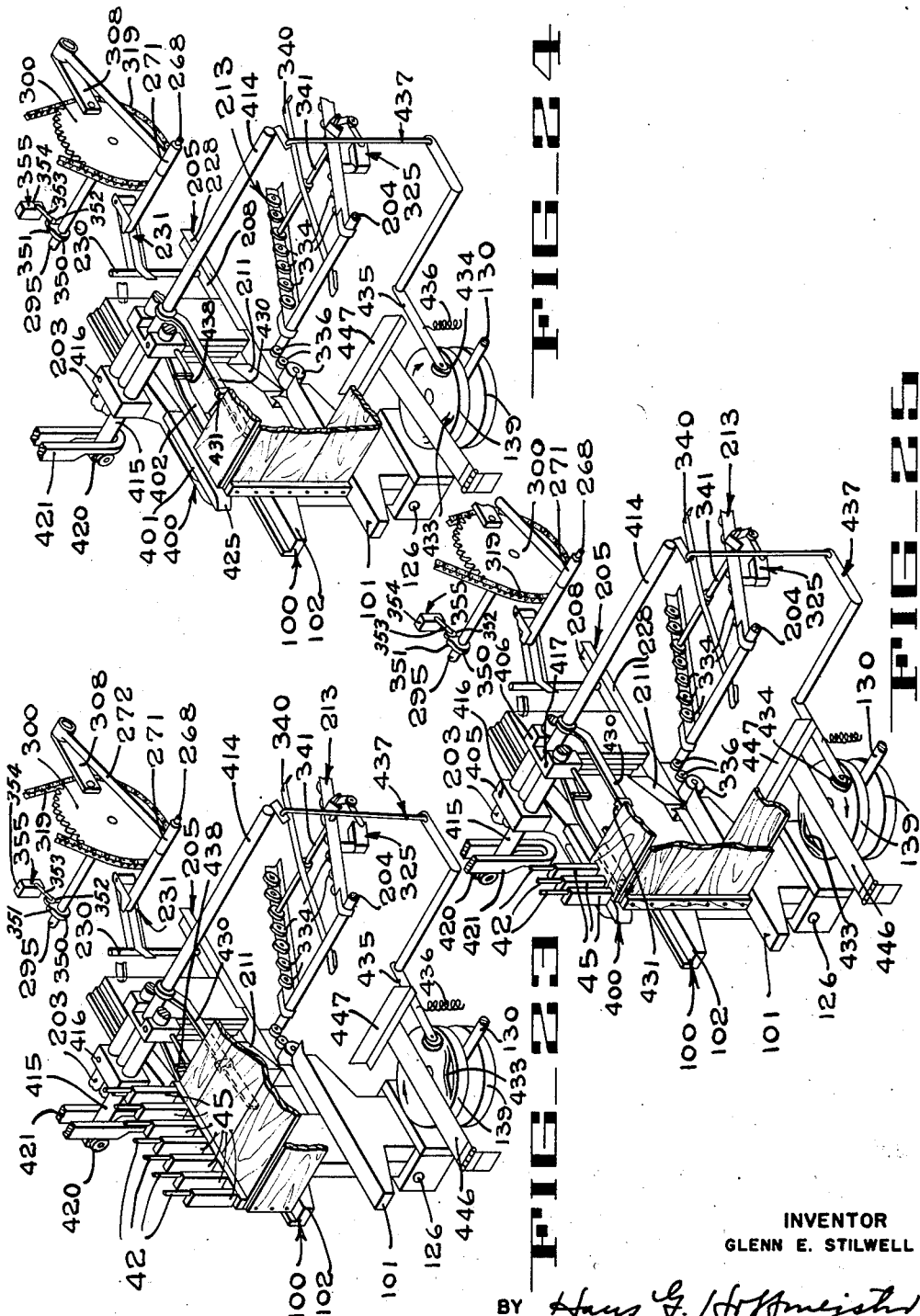
INVENTOR
GLENN E. STILWELL
BY Hans G. Hoffmeister
ATTORNEY United States Patent Office 2,787,001
Patented Apr. 2, 1957

2,787,001

ATTACHMENT FOR BOX MAKING MACHINE

Glenn E. Stilwell, Riverside, Calif., assignor to Food Machinery and Chemical Corporation, San Jose, Calif., a corporation of Delaware Application January 28, 1952, Serial No. 268,469

31 Claims. (Cl. 1—131)

This invention relates to box making machinery and more particularly to an attachment for manually-fed box making machines to automatically perform, and accordingly relieve the operator from the performance of, certain of the manual operations.

The type of box making machine to which a unit embodying the present invention may be attached generally comprises an upright rectangular frame with a vertically reciprocable nailing mechanism supported on its upper portion. Beneath said mechanism, a centrally open section receives the various boards termed box shook which are in proper sequence inserted and subjected to the action of the nailing mechanism to produce the finished box. The insertions are manually accomplished by an operator who stands adjacent what may be termed the "front" of the machine, and who is within convenient reach of stacks of the box shook. The operator first places a pair of box ends or heads in vertical position respectively upon suitably spaced supports beneath the nailing mechanism. One side board is then laid in bridging relation over the two box heads and is nailed thereto by the reciprocatory nailing mechanism. In turn, after successive 90° rotative movements of the box heads, the bottom and other side are secured thereto in the same fashion. The completed box is then normally removed from the front of the machine by the operator, and is placed on the floor at his side. The boxes, of course, accumulate adjacent the operator's position in front of the machine and must be removed periodically.

Dependent upon the experience and ability of the operator, a maximum of from four to six boxes may be made per minute. A time analysis of the operation has indicated that the insertion of the two box heads and the removal of the completed box constitute the two most time-consuming manual operations and those which vary most widely with the ability of the operator.

It is, therefore, a general object of the invention to expedite the production of boxes by reducing the time consumed in feeding box heads to a box making machine and in removing the finished boxes therefrom.

Another object of the invention is to provide an attachment for a manually-fed box making machine which renders the feed operation semi-automatic and thus reduces the wide variance in the box production rate which has resulted from the differing degrees of ability of the machine operators.

More particularly, it is an object of the present invention to provide an improved box head feed unit which may be attached to a manually-fed box making machine of the type described and which is operable to feed the box heads to said machine automatically.

Another object of the invention is to provide a box head feed unit for a box making machine which enables the discharge of the completed boxes through and from the rear of the machine to prevent their accumulation adjacent the operator.

A further object is to provide for the initiation of the automatic box head feed in response to the discharge of a completed box from the rear of the box making machine.

Additionally, it is an object to provide a box head feed unit for a box making machine which feeds the box heads thereto from the rear of the machine while permitting the discharge of the completed boxes from the rear of the machine also.

Another object is to provide a box head feed unit incorporating an improved mechanism for moving the box heads from a magazine at the rear of a box making machine into a position of assembly thereon.

A further object is to provide a box head feed unit which may be easily adjusted to handle box heads of various dimensions and to properly space the heads for accommodation of the side and bottom boards of boxes of different lengths.

Another object is to provide a box head feed unit whose weight and over-all dimensions are minimized.

It is yet another object to provide a box head feed unit which may be incorporated on a box making machine simply and with a minimum of modification of said machine.

These and other objects of the invention will become apparent from the following description of an embodiment of my invention as shown in the accompanying drawings wherein:

Fig. 2 is a right side elevation of the structure shown in Fig. 1 with parts broken away to illustrate details thereof.

Figs. 3A and 3B are horizontal sectional views of the right and left portions, respectively, of the structure, as taken along line 3—3 of Fig. 2, and provide substantially a top plan view of the box head feed unit in its operative setting.

Fig. 4 is a vertical section taken along line 4—4 of Fig. 1.

Fig. 5 is a horizontal section taken along line 5—5 of Fig. 1.

Fig. 6 is a vertical sectional view taken along line 6—6 of Fig. 4 to illustrate details of an anvil arrangement for supporting box parts in the box making machine during the nailing operations.

Fig. 7 is a horizontal section taken along line 7—7 of Fig. 6.

Figs. 8A and 8B are front elevations of the right and left portions, respectively, of the box head feed unit, detached from the box making machine, the views being taken to show the front of the unit which is arranged for connection to the rear of the box making machine.

Fig. 9 is an elevation of a switch mechanism associated with a box discharge conveyor incorporated in the box head feed unit.

Fig. 10 is a diagram illustrating the electrical control circuit of the box head feed unit.

Fig. 11 is a bottom plan view of the box head feed unit, parts being broken away.

Fig. 12 is a view, partly in section, taken in the direction of the arrows 12—12 in Fig. 3B, to illustrate interior construction of a clamp arm for the box heads.

Fig. 13 is a top plan view of a box head pusher rod and a carriage therefor.

Figs. 14 and 15 are right and left hand elevations, respectively, of the structure shown in Fig. 13.

Fig. 16 is an elevation of a portion of a drive mechanism which actuates the box head pusher rod and carriage shown in Figs. 13, 14 and 15.

Fig. 17 is a horizontal section taken on line 17—17 of Fig. 16.

Fig. 18 is a diagrammatic view illustrating the cyclical motion of said drive mechanism.

Fig. 19 is a perspective view, illustrating a stop member adapted to maintain a box head in operative nailing position.

Figs. 20 through 25 are diagrammatic perspective views of a box making machine having the box head feed unit of the invention attached thereto, with portions thereof broken away, and illustrate the operation of the present embodiment of the invention in a sequence of six steps.

Figure 1:
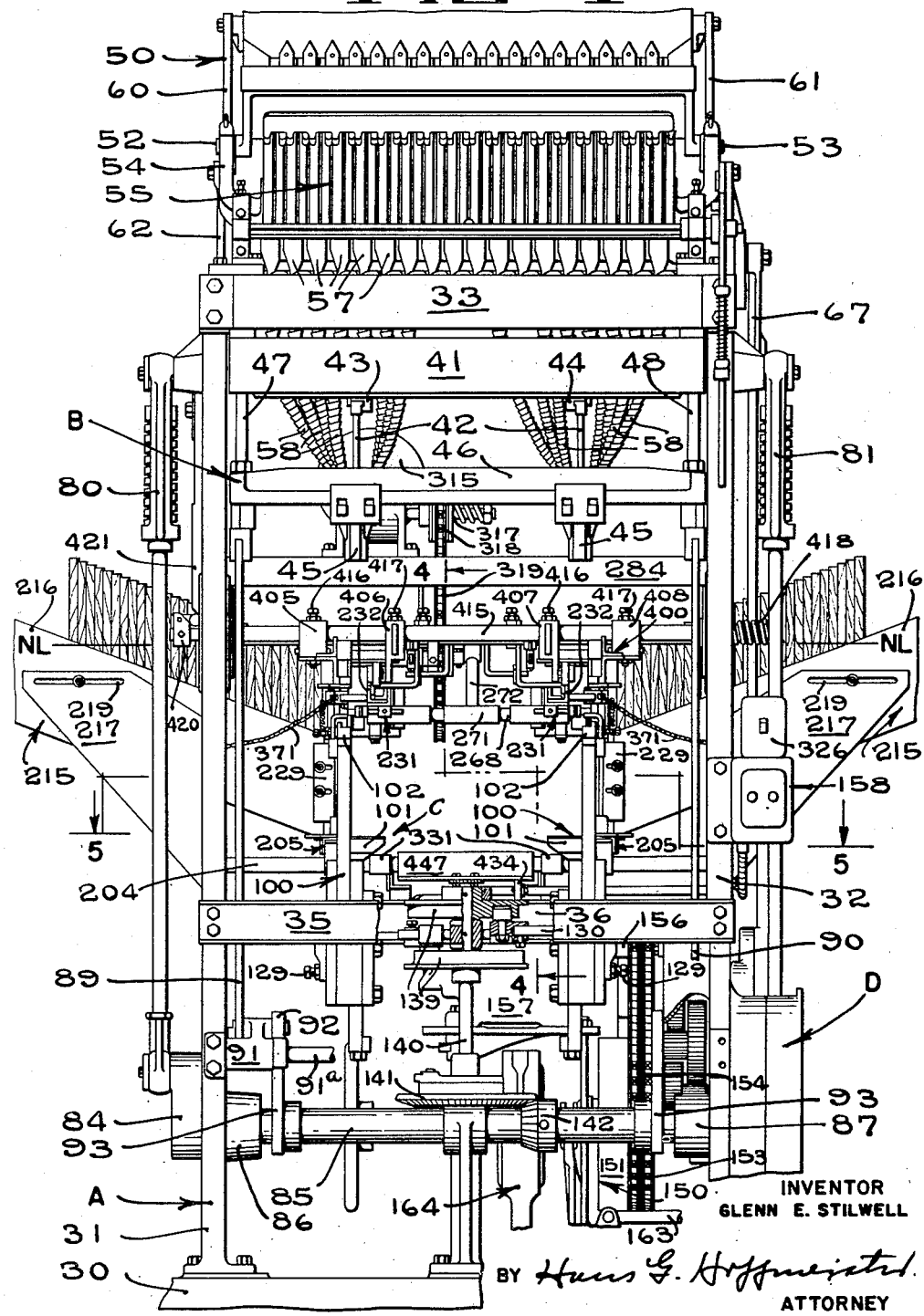
Fig. 1 is a front elevation of a box making machine having a box head feed unit embodying the present invention attached to the rear end thereof.

With reference to Figs. 1, 2, 3A and 3B, a box head feed unit embodying the present invention is shown attached to a particular box-making machine of known design. This particular box making machine generally comprises an upright rectangular frame A which mounts a vertically reciprocatory nailing mechanism B on its upper portion, a box-supporting means C immediately thereunder, and a drive mechanism D adjacent its lower end.

As shown clearly in Figs. 1 and 2, the frame A includes a flat, rectangular base 30 which rigidly mounts at its opposite ends a pair of standards 31, 32 which rise vertically therefrom in parallel spaced relation. This relation is rigidly maintained by parallel tie bars 33, 34 bolted at their extremities to the front and rear edges, respectively, of the standards adjacent their upper ends and a pair of I-beams 35, 36 similarly connected between the standards at an intermediate level.

Corresponding vertical slots 37, 38 are formed near the upper end of the two standards to receive a crosshead 41 for guided vertical movement. Said crosshead 41 constitutes an element of the nailing mechanism B which is substantially identical to that disclosed in the H. E. Twomley Patent No. 2,004,355, dated June 11, 1935. A set of nail punches in the form of rods 42 depend in parallel relation with their lower extremities in horizontal alignment from each of two spaced bridges 43, 44 on the crosshead, each nail punch being arranged in immediate super-position over one of a plurality of nail chucks 45 supported on a nail chuck yoke 46. This yoke 46 is suspended on the crosshead 41 by a pair of bars 47, 48 which are affixed to the yoke and extend vertically into suitable apertures in the crosshead for sliding engagement therewith to thereby permit relative vertical movement between the yoke and crosshead but preclude vertical misalignment thereof. The individual nail punches and nail chucks are arranged on the supporting crosshead and yoke, respectively, in a manner providing for their adjustment in a horizontal plane.

Nails are supplied to each of the nail chucks 45 by a nail feed mechanism 50 (Fig. 2) which comprises a nail pan or hopper 51 pivoted at one end on horizontal pins 52, 53 mounted at each end of a nail feed support bracket 54 secured to the upper ends of the frame standards 31, 32 of the box making machine. Stripper bars 55 carried by said bracket 54 and forming guide channels along which nails gravitate with their heads retained above the bars extend downwardly from the hopper 51 to nail picking devices (not shown) of conventional construction which pick nails individually from the lower ends of said channels and transfer them into funnels 57 positioned underneath from where flexible tubes 58 conduct them downwardly into the nail chucks.

The nail hopper 51 is supported for oscillation about its pivoted end by a pair of links 60, 61 which pivotally connect the opposite sides of the hopper to the ends of levers 62, 63. The other ends of said levers are secured to a transverse rod 64 pivotally mounted in brackets 66, (one being shown in Fig. 2) that are secured near opposite ends of the rear tie bar 34. Lever 63 is operatively engaged at an intermediate point by a connecting rod 67 which reaches down to and is pivotally engaged by an eccentric mounting pin 68 on a gear 69. Said gear 69 is secured to a stub shaft 70 that constitutes a component of the drive mechanism D, to be described in detail hereinafter. As said gear 69 rotates, the nail hopper 51 is oscillated into upwardly and downwardly inclined positions relative to its pivoted end by the cooperative action of the connecting rod 67, levers 62, 63 and links 60, 61 so that nails will be delivered to the stripper bars 55 in a well known fashion. The nails which descend by gravity on the stripper bars 55, are periodically and selectively removed therefrom by the nail picks and deposited in the funnels 57 from whence they rapidly slide into the nail chucks 45 preparatory to a box nailing cycle.

The periodic delivery of the nails from the stripper bars 55 to the nail chucks 45 is attained through actuation of the nail picks in response to an upward movement of the crosshead 41 in the instant box making machine. Briefly, the actuation is achieved by means of a vertical arm 71 secured at an intermediate point thereof to the crosshead 41 and arranged to engage a ratchet mechanism 72 on a transverse nail pick control bar 73, rotatably mounted on the nail feed bracket 54. With each rise of the crosshead 41, the arm 71 engages the ratchet 72 to rotate the control bar 73 a quarter revolution and thereby cause the nail picks to deliver one nail to each of selected nail chucks through the respective funnels and flexible tubes. The selective delivery is attained by disabling nail picks associated with certain of the funnels 57 and the selection itself will understandably be determined by the dimension and type of box to be produced.

To provide for the vertical reciprocation of the crosshead 41, each end thereof is extended outwardly from the guide slots 37, 38 in the standards 31, 32 for pivotal connection to the upper ends of pitmans 80, 81 of like construction. At its lower extremity the pitman 80 is pivoted to a crank 84 on one end of a main drive shaft 85 which is supported on suitable bearings 86, 87 provided in the standards 31, 32. The other pitman 81 is eccentrically pivoted to a crank gear 88 disposed on the main drive shaft 85 adjacent its opposite end.

The drive mechanism D is arranged for cyclical operation and each cycle provides for a single revolution of the drive shaft 85 to accordingly provide for a single reciprocation of the crosshead 41 which, as will be remembered, supports the nail punches 42. The yoke 46 which supports the nail chucks 45 is reciprocated in timed relation to the movement of the crosshead 41 by means of connecting rods 89, 90 pivotally secured to opposite ends of the yoke 46 and extending downwardly for pivotal connection to arms 91 (one shown in Fig. 1) which turn on a transverse shaft 91a that is supported in the standards 31, 32. Each of said arms 91 has a roller 92 arranged to engage a respective one of a pair of cams 93 secured in spaced relation on the drive shaft 85.

Briefly, the action of the nailing mechanism B comprises the driving of nails from the nail chucks 45 by the nail punches 42 into properly positioned box parts upon the downward movement of the chuck supporting yoke 46 and the punch supporting crosshead 41 and the subsequent replenishing of nails in the chucks upon the upward movement of the crosshead which actuates the nail picks of the nail feed mechanism B.

To position and support the box parts beneath the nailing mechanism, an anvil mechanism (Figs. 6 and 7) of well known construction, as shown in the G. C. Paxton Patent No. 2,232,725, is herein employed, it being understood that the box supporting means C may comprise other arrangements. Said anvil mechanism includes a pair of identical though reversely disposed anvil units 100 positioned respectively beneath the spaced sets of nail punches 42 to cooperate therewith. Since the anvil units are identical, only one will be described and like numerals will be employed in the drawings to designate corresponding parts of the anvil units 100.

Each anvil unit 100 includes a pair of juxtaposed anvils 101, 102 which are arranged for individual vertical adjustment to enable the support of box parts of various dimensions at a predetermined nailing level NL (Figs. 1 and 4) for cooperation with the nailing mechanism B. To this end, the anvils 101, 102 are provided with cylindrical apertures 103, 104 respectively which rotatably receive the reduced upper ends of supporting rods 105, 106 threaded for adjustable support in parallel threaded bores 107, 108 in a boss 109 formed integrally on and projecting laterally from a plate 110. The lower extremities of the supporting rods 105, 106 are formed with squared heads to facilitate adjustment, only the square head 111 of the rods 106 being shown in Fig. 6. Clamps 113, 114 are secured by cap screws 115 to the opposite ends of the boss plate 110 to form guides which hold the anvils 101, 102 somewhat loosely against the face of said plate 110 so as to maintain their juxtaposed relation while permitting the vertical sliding movement of the individual anvils when the threaded supporting rods 105, 106 are turned.

The anvil unit base 120 is provided with integral feet 121, 122 which are slidably disposed in the inner channels of the I beams 35, 36 extending between the vertical standards 31, 32 of the box making machine and horizontally disposed trunnion pins 125, 126 project inwardly from these feet for rotatable reception in corresponding holes 127, 128 formed in the clamps 113, 114 so that the anvils 101, 102 are pivotally supported on the slidable base 120. A set screw 129 (Figs. 1, 2, 6 and 7) is threadedly mounted in the anvil base 120 and extends horizontally into engagement with the lower portion of the outer anvil 102 to form a stop which permits the upper portion of the anvil unit 100 to pivot outwardly but prevents inward pivoting thereof beyond a vertical position.

An anvil unit actuating means is provided to slide each anvil unit base 120 along the I beams 35, 36 and position one or the other of the anvils 101, 102 directly beneath one aligned set of nail punches 42 and chucks 45 as required for a particular box nailing operation. Said means includes a horizontal bar 130 (Figs. 1 and 6) affixed to each anvil unit base 120 by a set screw 131 at its outer end. The inner end of each bar 130 (Fig. 7) is secured by another set screw 132 to a cam follower 133 slidably supported on horizontally positioned parallel rods 134, 135 mounted at opposite sides of the bar 130 on a strut 136 which is bolted at its ends to the I beams 35, 36 of the machine frame A. A roller 137 (Figs. 1, 6 and 7) on each follower 133 is arranged to engage an annular channel 138 formed in a respective one of a pair of cam plates 139 secured in vertically spaced relation on a vertical shaft 140 for rotation therewith. Said shaft 140 is journaled centrally in the cam follower support strut 136 and mounts a miter gear 141 (Fig. 1) at its lower end for engagement with a miter pinion 142 on the main drive shaft 85 of the drive mechanism. The geared connection is such that one revolution of the cam plates 139 results from three revolutions of the drive shaft 85 and the configuration of the annular channels 138 in the cam plates 139 provides that the anvil units 100 are held in outwardly thrust position with the inner anvils 101 beneath the two sets of nail punches 42 and chucks 45 during the first and last thirds of each revolution of the cam plates, but are moved to and maintained at their innermost position with the outer anvils 102 beneath the sets of punches and chucks during the intermediate one third of each revolution.

As a result of the foregoing arrangement of the anvil unit actuating means, three cycles of the box making machine comprising three revolutions of the main drive shaft 85 cause three reciprocations of the nailing mechanism B, three nail feed operations and one complete revolution of the cam plates 139 for the anvil units 100. During the first cycle, the inner anvils 101 are in operative position beneath the nail punches 42; during the second cycle, the outer anvils 102 are in operative position; and during the third cycle, the inner anvils 101 are again positioned beneath the punches 42 and chucks 45.

Each cycle of the box making machine is instigated manually and is terminated automatically through the use of a clutch 150 (Fig. 1) incorporated in the drive mechanism D. Said clutch 150 includes a drum 151 which receives an expandable friction ring (not shown) secured to a clutch shaft 152. The clutch drum 151 is mounted for free rotation on the clutch shaft 152 and has a double sprocket 153 (Figs. 1 and 2) formed integrally therewith which sprocket is connected by chains 154 with a drive sprocket 155 secured on the shaft 156 of an electric motor 157 suitably supported by the machine frame and energized through a switch 158 that is conveniently mounted on the pedestal 32. A foot pedal 159 (Fig. 2) mounted on the frame base is connected by suitable actuating linkage (not shown) to the expandable clutch ring so that upon depression of the pedal by an operator, the ring is brought into engagement with the interior of the clutch drum 151 to provide for the rotation of the clutch shaft 152. The linkage is such that driving engagement is maintained after the operator removes his foot from the pedal 159. Said rotation of the clutch shaft 152 is transmitted through a train of reduction gears 160 (Fig. 2) to the nail hopper gear 69, previously mentioned, to produce a slow oscillation of the nail hopper 51. Additionally, a pinion 161 on the clutch shaft 152 meshes with the previously mentioned crank gear 83 on the main drive shaft 85 to produce rotation of the latter.

A cam (not shown) on the inner side of said crank gear 83 is adapted upon the completion of a single revolution to engage a rod 163 (Fig. 1) operably connected to the clutch actuating linkage whereby the clutch 150 becomes disengaged. The same cam actuation of the rod 163 is operable in a well known manner to set a brake 164 on the clutch shaft 152, said brake being automatically released upon depression of the described pedal 159.

In the exemplary embodiment of a box making machine, as shown in the drawings, the production of a shallow box (i. e., a box whose depth is considerably less than its width) of the type employed in packing grapes, apples, pears and the like, is contemplated. In order that the parts of such boxes will be supported at the correct nailing level NL during each cycle of the machine, the inner anvils 101 are positioned with their supporting surfaces considerably lower than those of the outer anvils 102 as illustrated in Fig. 6. Consequently, during each of the first and third cycles when a side wall is to be nailed to the box heads, one short edge of the heads rests upon the operatively positioned inner lower anvils 101 and since the longer dimension of the heads extends vertically, the other short edge is positioned at the correct nailing level NL. On the other hand, during the second or middle nailing cycle, the outer and higher anvils 102 are in operative position and the short dimension of the box heads becomes the vertical dimension and the upper long edges of the heads are supported at the correct level NL so that the bottom wall may be properly secured thereon by the nailing mechanism.

The box head feed unit has a frame 200 (Figs. 2, 3A, 3B, 4, 8A, 8B and 11) which includes a pair of side plates 201 of generally rectangular configuration, each having an apertured flange 202 adapted to be bolted to the rear of a respective one of the standards 31, 32 of the box making machine. When so secured to the standards the plates 201 are rigidly held in vertical position and extend rearwardly from the standards in spaced parallel relation. Spacer bars 203, 204 extend between the plates near the upper and lower rear corners thereof to help maintain this parallel relation.

In accordance with the invention, two paths for supplying vertically disposed box heads to the spaced inner anvils 101 from the rear of the box making machine are provided by a pair of horizontal feed tracks 205 supported immediately above the lower spacer bar 204 and extending forwardly between the side plates 201 in parallel spaced relation to a point in close proximity to said inner anvils 101. These feed tracks 205 are reverse duplicates of one another and the same structural situation prevails in the elements associated therewith. Consequently, like numerals are employed in the drawings to designate corresponding elements.

Each of the tracks 205 is formed by an angle iron 206 affixed to a mounting block 207 so that one flange 208 of the iron may lie in a substantially horizontal plane to provide a box head supporting surface. The mounting block 207 (Figs. 4, 8A and 8B) is adjustably secured to the lower spacer bar 204 by a set screw 209 whereby the angle iron 206 may be shifted lengthwise of the spacer bar 204 into the proper lateral position relative to the respective inner anvil 101. The ends of the spacer bar 204 are held in vertical slots 210 in the mounting plates 201 by means of suitable bolts 204a so that said bar 204 and, accordingly, the angle irons 206 supported thereon may be vertically adjusted with the box supporting surfaces thereof in coplanar relationship with the surface of the inner anvils 101. A short rail 211 is adjustably secured by a bolt 212 to the box head supporting flange of each track 205 to extend angularly thereacross and terminate adjacent the interior forward corner 206a thereof (Fig. 5). By means of the lateral adjustment of the tracks 205 on the spacer bar 204 as hereinabove described, the tracks may be disposed in greater spaced relation than the inner anvils 101 so that the interior forward corner 206a of each track is immediately adjacent the outer rear corner of the respective inner anvil 101 associated therewith.

This structural arrangement (Fig. 5) establishes supply paths that converge upon their close approach to the inner anvils 101 of the box nailing machine and, as will become apparent hereinafter, accordingly enable the discharge of completed boxes from the rear of the box making machine onto a box discharge conveyor 213 which is disposed between the feed tracks 205.

Box heads are supplied to the feed tracks 205 at their rearward ends which extend from between the mounting plates 201 to points adjacent box head feed magazines, generally indicated by the numeral 215. Said magazines 215 comprise a pair of lateral troughs 216, each of which extends downwardly and toward a respective one of said feed tracks 205. Each trough 216 is supported by an ear 217 having a rectangular flange 218 bolted against the exterior side of one of the mounting plates 201 in a position below the upper spacer bar 203. Each ear 217 (Figs. 8A and 8B) is provided with a horizontal slot 219 so that the forward side 220 of the trough 216 may be bolted therethrough in such a position that a dependent lip 221 (Figs. 2 and 4) on the discharge end of the trough may lie against the dependent flange 222 of the angle iron 206 forming the feed track and be adjustably bolted thereto through a horizontal slot 223 therein. To assure that this lip 221 will be disposed at the proper level and may be shifted vertically in accord with a vertical adjustment of the feed track 205, the mounting plate 201 is provided with a slot 224 (Figs. 2 and 4) vertically aligned with the previously mentioned slot 219 which permits adjustment of the lower spacer bar 204. The trough supporting ear 217 is bolted to the mounting plate 201 through said slots 219 and 224 and a long suspension bolt 225 may be supported from the feed unit frame to extend through aligned vertical threaded bores in webs 226 on the ear 217 so as to provide for accurate vertical adjustment of said ear.

The degree of adjustability of the feed tracks 205 is such that they may be properly positioned relative to the anvils 101 through the full range of adjustment of the latter, as previously described herein. In like manner, the feed magazines 215 may be adjusted to accommodate the extremes of adjustment of the feed tracks 205. Accordingly, any box head which may be handled by the box making machine may be fed thereto from the feed magazines 215 and along the tracks 205 of the box head feed unit of the present invention.

It will be apparent that the troughs 216 forming the feed magazines of the present device may be of any suitable length to accommodate a desired supply of box heads or boards. The heads are placed in the troughs on their edges in substantially vertical position and are urged by gravity down the inclined floors of said troughs onto the feed tracks 205. A weighted roller 227 may, if desired, be positioned in the trough behind the rearmost box head to increase the gravitational urgency.

A stop rail 228 (Figs. 2, 4 and 5) is provided on each feed track 205 opposite the discharge end of the respective trough 216 to limit the movement of the foremost box head across the track and thus properly position this box head for relatively transverse movement forwardly on the feed track toward the corresponding inner anvil 101. An adjustable extension of the forward side 220 of the trough 216 is provided by a small slotted plate 229 bolted to said trough side. Said plate 229 is adjusted in determined lateral relation to the above described stop rail 228 so that only a single box head may progress toward an anvil 101 in the manner indicated above.

To propel the box heads resting on the two feed tracks 205 forwardly therealong onto the spaced inner anvils 101, a pair of like pusher rods 230 (Figs. 2, 4, 11, 13, 14 and 15) are supported by and beneath individual carriages 231 slidably mounted upon spaced carriage rails 232 (Figs. 2, 4 and 11). Such rails 232 comprise a pair of angle irons 233 (Figs. 3A, 3B, 8A and 8B) suspended at intermediate points thereof from brackets 234 (Fig. 4) secured to the upper spacer bar 203, previously described, so as to extend horizontally in substantial parallelism with the feed tracks 205, above and slightly inwardly thereof. Adjacent the feed magazines 215 a pair of spaced brackets 235, 236 (Figs. 2 and 4) are welded to and rise from each carriage rail 232 to adjustably support a slotted stop plate 237 (Figs. 3A and 3B) which cooperates with the stop rail 228 on each feed track 205 so the foremost head will be vertically disposed thereon. A finger 237a adjustably secured on the plate 237 engages the rear edge of said box head.

The free flanges 238 (Figs. 4, 8A and 8B) of the angle irons 233 forming the carriage rails 232 are disposed in horizontal inwardly facing relation to provide a flat supporting surface for the individual carriages 231 and the carriages are each provided with a channel 240 (Fig. 14) of such dimension as to embrace slidably the free flange 238 of a respective one of the carriage rails 232. As shown in Figs. 13, 14 and 15, such a channel 240 may be conveniently formed by a pair of short angle irons 241, 242 of unlike cross section. The vertical flange 243 of the smaller angle iron 241 is bolted to the interior of the vertical flange 244 of the larger angle iron 242 so that the horizontal flanges 245, 246 of the two angle irons are properly spaced to provide the correctly dimensioned channel 240.

A vertically depending stub shaft 248 (Fig. 11) is secured to the lower rear surface of the carriage 231 (Figs. 13, 14 and 15) and loosely telescoped over said shaft is a tube 249 held on the shaft by means of a retaining washer 250 and nut 251. A plate 252 is bent at an obtuse angle about said tube 249 and is welded or otherwise secured thereto for rotational movement therewith about the stub shaft 248. At one end 253, the plate 252 is slotted as shown at 254 for the reception of bolts 255 in a horizontally extending arm 256 which slidably supports the pusher rod 230 in a vertical sleeve 257 formed at its extreme end. Nuts 258 which are screwed upon the bolts 255 to normally clamp the supporting arm 256 in a given position on the bent plate 252 may be quickly loosened to enable horizontal adjustment of the pusher rod 230. A set screw 259 (Fig. 13) is adapted to extend through the sleeve 257 of the supporting arm 256 and adjustably clamp the pusher rod 230 in a desired vertical position therein.

Since each pusher rod 230 must be in precise vertical alignment above the respective feed track 205 to function properly, and since the feed tracks are spaced farther apart than are the carriage rails 232, that end 253 of the bent plate 252 and the arm 256 associated therewith, which provide the pivotal support for each rod 230, necessarily extend outwardly at a slight angle from the rear end of the carriage 231 (Figs. 11 and 13). When thus positioned, the other end or tail portion 260 of the bent plate 252 extends transversely under the carriage 231. One end of a spring 261 is connected to the tail portion 260 of the plate 252 and its other end is connected to a pin 262 depending from a forward point of the carriage 231 so that the spring 261 is held under tension. By this arrangement, the tail portion 260 of the bent plate 252 is constantly urged forwardly of the carriage 231 and the pusher rod 230 is accordingly urged outwardly therefrom.

A stop 263 is bolted to the carriage 231 to be engaged by a set screw 264 threadedly secured in the tail portion 260 of the plate 252, whereby an adjustable limit for the yieldable outward movement of the pusher rod 230 is provided.

By proper adjustment of this limit of pivotal movement and by proper adjustment of the adjustable supporting arm 256 for the pusher rod 230, previously described, said rod 230 may be positioned directly above the respective feed track 205. When so positioned, the rod 230, upon its forward movement engages the rear edge of a box head resting on the feed track 205 against the stop rail 228 and stop plate 237 and subsequently propels the box head forwardly along the track 205 toward the respective inner anvil 101 of the box making machine.

So that the position of the pusher rod 230 against the rear edge of the propelled box head will be maintained when the feed path breaks inwardly upon its approach to the anvil 101, a strap 265 is secured to the inner side of the pusher rod supporting arm 256 and extends slightly forwardly of the pusher rod to lie against the inner corner of the rear edge of the box head. Therefore, as will be apparent, when the box heads start to converge, they will urge the respective straps 265 inwardly against the action of the springs 261 and the pusher rods 230 will automatically follow the respective rear edges of the box heads.

Upon said convergence of the box heads, each box head becomes pressed against a spring finger 266 secured for lateral adjustment by means of a set screw 267 on the foremost end of each pusher rod carriage 231. As will become more readily apparent hereinafter, said spring fingers 266 co-act with the straps 265 on the pusher rod supporting arms 256 to maintain the required vertical position of the box heads as they move onto the inner anvils 101.

The individual carriages 231 which support the box head pusher arms are connected for simultaneous horizontal reciprocatory movement toward and away from the box making machine so that there can be no discrepancy in the time of arrival of two box heads on the spaced inner anvils 101. To this end, the spaced carriages 231 are connected by a bar 268 (Figs. 1, 2, 4, 3A, 3B, 8A, 8B and 11) which extends transversely therebetween and enters a cylindrical socket 269 (Figs. 11, 13, 14 and 15) provided on each carriage. Set screws 270 retain the ends of the bar firmly in said sockets 269.

A tube 271 (Figs. 4 and 11) is rotatably arranged around the central portion of the transverse bar 268 and an actuating rod 272 welded to the exterior of said tube extends rearwardly to the drive mechanism 280 (Figs. 2, 4, 16 and 17) of the box head feed unit.

Said drive mechanism 280 includes a frame 281 which may be shifted longitudinally along a pair of supporting angle irons 282 which are bolted to the upper portion of the spaced mounting plates 201 to extend rearwardly therefrom in parallelism with both the feed tracks 205 and the carriage rails 232. The frame 281 comprises a pair of side plates 283 (Figs. 2, 3A, 3B, 4 and 11) of substantially triangular configuration which are supported in parallel spaced relation by transverse angle bars 284, 285 welded thereto adjacent two respective apexes. The plates 283 are, adjacent the edge which joins those two apexes, bolted to the rearwardly extending angle irons 282 through horizontally extending elongated slots 286 therein to permit the described shifting of the drive mechanism 280, when desired. When so secured, the third apex of the respective triangular side plates 283 extends downwardly a substantial distance. A bar 287 (Figs. 4 and 11) is rigidly secured between said third apexes of the side plates 283 and assists in the support of the carriage rails 232 through the medium of a pair of blocks 288 on the bar 287 which blocks are bolted to said rails 232 through slots 289 (Fig. 11) formed near the rearmost ends thereof.

An additional plate 290 (Figs. 4, 8B and 11) depends from the transverse angle bars 284, 285 centrally thereof and has a hole 291 (Figs. 16 and 17) near its lower end in horizontal axial alignment with a bearing 292 (Figs. 3B and 11) on one of the side plates 283. A drive shaft 295 is rotatably supported in said bearing 292 and in the bore 296 (Fig. 17) of a sprocket 297 whose hub 298 is bolted rigidly to the side of the central plate 290 in concentric relation with the hole 291 therein. A set collar 299, which is situated within this hole 291, is secured to the drive shaft 295 to abut the hub 298 of the fixed sprocket 297 on one side while a large drive sprocket 300 keyed on the end of the drive shaft 295 is secured against relative axial movement thereon by a set screw 301 so as to lie against the other side of the fixed sprocket hub 298. Thus, the drive shaft 295 is locked against axial movement relative to the central plate 290 which constitutes a rigid element of the drive mechanism frame 281.

A stub shaft 302 (Fig. 17) is rotatably supported within a bearing 303 positioned eccentrically on the drive sprocket 300 in parallel relation to the axis thereof. A pinion sprocket 304 is formed integrally on one end of the stub shaft 302 in coplanar relation with the fixed sprocket 297 so that a chain 305 trained about these two sprockets 297 and 304 provides for planetary movement of the pinion sprocket 304 around the fixed sprocket 297. The pinion sprocket 304 has exactly one-half the number of teeth of the fixed sprocket 297 wherefore it will revolve twice on its own axis during each revolution of the drive sprocket 300. A slot 306 is provided in the drive sprocket 300 so that a rotatably mounted roller 307 may be adjustably clamped in rolling engagement with the planetary sprocket chain 305 to tension the same.

A crank arm 308 is keyed to the opposite end of the stub shaft 302 so that when the drive sprocket 300 is rotatively positioned with the stub shaft 302 disposed horizontally rearwards of the drive shaft 295, the crank arm 308 extends rearwardly from the stub shaft 302 in the horizontal plane determined by the two shafts 295 and 302 as shown clearly in Fig. 4 and as indicated at 308a in Figure 18.

As the drive sprocket 300 rotates in a clockwise direction, as viewed in Fig. 16, the planetary sprocket 304 rotates in a counterclockwise direction about its own axis to accordingly move the outer end of the crank arm 308 inwardly in the general direction of the drive shaft 295. With the given 2 to 1 ratio of the fixed sprocket 297 relative to the planetary sprocket 304, the latter will rotate 180° on its own axis as the drive sprocket 300 moves 90°. Therefore, upon completion of one quarter of a revolution of the drive sprocket 300, the end of the crank arm 308 will vertically intersect the axis of the drive shaft 295, as is diagrammatically illustrated at 308b in Figure 18. Additional 90° of rotation of the drive sprocket 300 will cause another half revolution of the planetary sprocket 304 to therefore return the crank arm 308 to an outwardly extending horizontal position indicated at 308c in Figure 18. In like manner, the crank arm 308 first pivots inwardly and then outwardly during the subsequent completion of a single revolution of the drive sprocket 300 to accordingly return the crank arm 308 to its original horizontal position 308a shown in Figs. 4 and 16.

Three longitudinally spaced holes 309, 310, 311 are provided near the end of the crank arm 308 to enable the selective pivotal connection thereto of the actuating rod 272 for the pusher arms 230, previously mentioned. In Figure 4, the pivotal connection is made at the outermost hole 311 which is spaced from the axis of the stub shaft 302 a distance which is slightly greater than the distance between this axis and that of the drive shaft 295. As a result of this dimensioning, the pivot point of the actuating rod 272 on the crank arm moves in a flat elliptical orbit, designated with 0 in Figure 18, the major axis of the ellipse being horizontal and of a length equal to twice the distance between the pivot hole 311 and stub shaft 302 plus twice the distance between the stub shaft 302 and drive shaft 295. The linear movement or stroke of the forward end of the actuating rod 272, i. e., the end that is pivotally connected to the spaced carriages 231, will, of course, be equivalent to the length of the major axis of the ellipse, as above determined. If the innermost hole 309 on the crank arm 308 be chosen for making the pivotal connection with the actuating rod 272, the orbit of said pivotal connection will be substantially rectilinear since the distance from this hole 309 to the axis of the stub shaft 302 is approximately equal to the distance from this axis to the axis of the drive shaft 295.

From the foregoing, it will be apparent that the drive arrangement for the box head pusher rods 230 constructed in accordance with the present invention provides for a long stroke of said rods while employing rotary drive elements of conveniently small dimensions. Since the crank arm 308 pivots inwardly and moves into juxtaposition with the drive sprocket 300 during operation of the described mechanism, the spatial requirements for installation of said drive mechanism in a vertical direction are minimized, and as a consequence of this, it will be appreciated that the weight of the whole box head feed attachment is held low.

Rotary movement is imparted to the drive sprocket 300 from an electric motor 315, bolted upon the upper angle bars 284, 285, through a speed reducer 316 and a friction clutch 317 of conventional design, the latter incorporating a sprocket 318 operatively connected to the drive sprocket 300 by a chain 319. Since these elements are of conventional construction and operate in the usual way for usual purposes, they need not be described in detail. Suffice it to say that the speed reducer 316 enables the rotation of the drive sprocket 300 at a reduced, but constant speed and the friction clutch 317 precludes damage to the drive elements, if, in some way, their movement is blocked.

A switch 325 (Figs. 2, 4, 5 and 9) is arranged to close the energizing circuit (Fig. 10) for the motor 315 upon the discharge of a completed box from the box making machine so that a pair of box heads will immediately thereafter be supplied to the inner anvils 101 and the production of another box may be instigated. A manual switch 326 (Figs. 1 and 10) is connected in series with said automatic switch 325 and is mounted on the standard 32 so as to be adjacent the manual switch 158 which controls the motor 157 of the box making machine.

To achieve prompt energization of the motor, the automatic starting switch 325 is associated with the box discharge conveyor 213 (Figs. 2, 4, 5, 8A, 8B and 9), previously mentioned. Said conveyor 213 comprises a pair of transversely spaced parallel angle bars 330, each provided at one end with a hook 331 that is adapted to overlie the lower spacer bar 204 extending between the two mounting plates 201, as hereinbefore described. A rigid strap 332 extends transversely beneath the angle bars 330 and is bolted to the horizontal flanges 333 thereof to maintain the bars 330 in parallel spaced relation somewhat inwardly of the box head feed tracks 205. The box conveying surface of the conveyor is provided by a sequence of aligned rollers 334 supported for rotation about transverse axes in the upturned flanges 335 of the angle bars 330. Suitable supports (not shown) hold the angle bars 330 in rearwardly declining position so that a box pushed onto the rollers 334 may move rearwardly from the box making machine under its own momentum, encountering but a minimum of frictional resistance. Several additional rollers 336 are rotatably supported on the inner side of each of the feed tracks 205 (Figs. 4 and 5) between the anvils 101 and the forward end of the conveyor 213 to provide for the transfer of completed boxes onto the conveyor rollers 334. The feed tracks 205 will not interfere with the transfer of completed boxes to the conveyor 213 since the tracks are disposed outwardly from the anvils 101, as previously described.

A switch actuating lever 340 (Figs. 4, 5, 9 and 10) disposed intermediately, and extending longitudinally, of the conveyor angle bars 330 is secured at an intermediate point to a transverse shaft 341 rotatably mounted in bearings (not shown) in said bars 330. The lever 340 extends further forwardly from the shaft 341 in the direction of the box making machine than it does rearwardly therefrom and is accordingly overbalanced so that the rearmost end thereof is constantly urged to a position somewhat above the plane of the supporting rollers 334, as shown in Figure 9. The upward movement of the rear portion of the lever 340 is limited by the engagement of the forward portion thereof with the transverse spacing strap 332, previously described (Fig. 5).

A bracket 342 (Figs. 4 and 9) is secured to an outermost end of the transverse shaft 341 and carries a hinge 343 upon which is mounted a cam 344. An adjustable stop 345 comprising a set screw on the bracket 342 limits the pivoted movement of the cam 344 in a counterclockwise direction, as viewed in Figs. 4 or 9. A roller 346 is rotatably supported on the arm 347 of the previously described starter switch 325 which is encased in a box 348 that is secured to and beneath the transverse strap 332. The switch arm 347 is urged into a position adjacent to, and on the clockwise side of the cam 344 by suitable spring means (not shown).

As a box is discharged along the conveyor 213, it depresses the switch actuating lever 340 to rotate the shaft 341 and the bracket 342 in a clockwise direction. Since the cam 344 is restrained against counterclockwise movement on its hinged support 343 by the stop 345, it also moves in a clockwise direction to thereby depress the roller 346 and the arm 347 as it passes thereover into the position shown in broken lines in Figure 9. The roller 346 and the arm 347 may immediately thereafter return to their upper position but do not interfere with the return movement of the cam 344 since the latter may pivot clockwise on its hinge 343. The return movement of the cam 344 is, of course, delayed until the box has passed downwardly on the inclined conveyor 213 out of depressing engagement with the switch actuating lever 340 and said lever has, through its overbalanced arrangement, moved again towards its upper or idle position.

When the switch arm 347 is momentarily depressed, as above described, the starter switch 325 is closed to energize the motor 315 and to simultaneously establish a holding circuit through a relay-actuated switch 349 (Fig. 10) secured to the mounting plate 201 (Fig. 2) for maintaining such energization after the switch arm 347 has moved upwardly and the starter switch 325 is again open.

The rotation of the motor 315 is transmitted to the drive mechanism 280 which moves the pusher rods 230 forwardly to engage and transfer a pair of box heads along the tracks 205 onto the inner anvils 101 of the box making machine. The direction of movement of the pusher rods 230 is then reversed and they return toward their rearmost position, as shown in Figure 4.

As the rearmost position is reached and a box head feed cycle is completed, means enter into operation to automatically de-energize the motor and stop further movement of the pusher rods. For this purpose, a cam 350 (Figs. 4, 10 and 11) is keyed in a predetermined rotative position to the drive shaft 295 of the drive mechanism 280 so that its single lobe 351 will, upon completion of an operational cycle of the drive mechanism 280, engage a roller 352 at the outer end of a spring-loaded switch arm 353 which extends from a switch box 354 containing a normally-closed stop switch 355 (Fig. 4). When this switch 355 is opened by the depression of the arm 353, the holding circuit established through the relay-actuated switch 349 as above described, is opened and the motor 315 is stopped. The motor 315 remains de-energized, and the pusher arms 230 are held at rest in their rearmost position until the starter switch 325 is again closed by the discharge of a completed box, as hereinabove described.

A pair of box head stops 360 (Figs. 4, 6 and 19) are operatively associated with the lower inner anvils 101 at the entrance ends thereof. These stops are so arranged as to pass the box heads when they are fed by the pusher rods 230 onto the anvils, but are effective to prevent rearward movement of the box heads when the pusher rods 230 are rearwardly withdrawn. To this end, the stops 360 are mounted for lateral movement into or out of the feed paths of the box heads. Having specific reference to Figure 19 which illustrates the stop associated with the right inner anvil 101, as viewed in Figure 1, a pin 361 is mounted on a bracket 362 which is bolted to and extends rearwardly from each outer upper anvil 102 and the pin 361 rises vertically from the bracket 362 to pivotally support a mounting block 363 at its upper end. Each stop 360 comprises a thin rod 364 which is slidably inserted through a horizontal bore 365 in the mounting block 363, said bore being displaced inwardly of the pivotal axis of the mounting block. A set screw 366 enables the rod 364 to be adjustably clamped within the bore 365 so as to extend forwardly over the inner anvil 101 at which point the rod is rectangularly bent as shown at 367. A spring 368 is connected under tension between a hook 369 on the outer side of the mounting block 363 and the shank of a bolt 370 on the outer anvil 102 so that the line of tensile force is displaced outwardly from the pivotal axis of the mounting block 363. As a result thereof, the rod 364 is constantly urged inwardly to its position over the inner anvil 101. A chain 371 connected between a forward portion of the mounting block 363 and a clamp 372 (Fig. 4) adjustably secured in a vertical slot 373 in the mounting plate 201 limits the inward pivotal movement of the rod 364 so that when the rod 364 is in its innermost position the bent portion 367 thereof is positioned directly above the lower inner anvil 101.

The bracket 362 (Fig. 19) connected to the outer anvil 102 (Fig. 4) supports for fore and aft adjustment a strap 374 having an upward hook-like projection adjacent and above the rear edge of said outer anvil to provide a stop 375 for a box head when it is positioned thereon during the second nailing cycle, as will be more fully explained hereinafter. Additionally, said bracket 362 angles outwardly in its rearward extension from the anvils 102 so that it lies in direct super-position above the guide plate 211 on the corresponding feed track 205 to accordingly assist in the inward guiding of the box heads as they approach the inner anvils 101.

As a box head is moved past the guide plate 211 (Fig. 5) and superposed bracket 362, the spring finger 266 on the pusher rod carriage 231 maintains the box head against said plate 211 and the bracket 362. Subsequently, the same outwardly directed pressure exerted by the spring finger 266 causes the box head to cam the pivoted stop rod 364 outwardly against the urgency of the spring 368. After the box head has advanced a sufficient distance onto the anvil 101 so as to bring the rear edge of the box head forwardly of the end 367 of the stop 360, the latter is free to return to its normal position (Fig. 19) above the lower anvil 101 under the urgency of the spring 368. As the feed carriage 231 reverses its direction, the spring finger 266, through its frictional engagement with the box head, drags the same rearwardly on the anvil 101 until the rear edge of the box head engages the end 367 of the stop 360. Then, as the feed carriage 231 continues its rearward movement, the spring finger 266 merely slides along the box head, being unable to drag it rearwardly any farther. In this manner, the box head is positioned accurately in fore and aft direction on the lower inner anvil 101 for the first nailing cycle of the box making operation.

The clamping means 400 (Figs. 1, 2, 4, 8A, 8B, 11 and 12) for the box heads generally comprises two pairs of arms 401, 402 and 403, 404, each pair supported so as to receive a box head therebetween as it is moved onto a respective one of the anvils 101 and one arm of each pair is supported for movement relative to the other to permit subsequent clamping of the box head in proper nailing position.

The clamping arms 401, 402, 403, 404 are suspended and extend forwardly from spaced mounting blocks 405, 406, 407, 408 each of which has three transverse holes 409, 410, 411 therein (Fig. 3A). The rearmost hole 411 of each mounting block receives the previously mentioned spacer bar 203 which is connected rigidly at its opposite ends by set screws 412 (only one of which is shown in Fig. 2) to bearing blocks 413 welded to the exterior surface of each of the feed unit mounting plates 201. A smaller bar or shaft 414 is rotatably supported at its ends in suitable bearings (not shown) in the bearing blocks 413 to extend freely through the central holes 410 in each of the mounting blocks 405, 406, 407 and 408 and a third bar 415, slidably supported for axial movement in the bearing blocks 413, extends through the foremost holes 409 of the mounting blocks for purposes to become apparent.

The two mounting blocks 405 and 407 which support the left clamping arms 401 and 403, respectively, of the two pairs of clamping arms are secured to the stationary spacer bar 203 by set screws 416 but permit the forwardly positioned bar 415 to slide axially in the holes 409. To the contrary, the other two mounting blocks 406 and 408 supporting the right clamping arms 402 and 404 may slide axially of the spacer bar 203 but are secured to the forward bar 415 by set screws 417 for movement therewith. A spring 418 is compressed between a collar 419 on the right end of the slidable bar 415 and the exterior of the mounting plate 201 to normally maintain this bar 415 in a rightward position (as viewed in Figs. 3A and 3B) wherein the clamping arms 401, 402, 403 and 404 are in open box head receiving relation. A cam block 420 (Figs. 1, 3B, 20 to 25) is secured to the left end of this slidable bar 415 and is adapted to be engaged by a cam 421 that is rigidly supported from the crosshead 41. The arrangement is such that the cam engages the cam block 420 to shift the slidable bar 415 (Fig. 1) to the left during the descent of the crosshead 41 but prior to the actual driving of the nails from the nail chucks 45 on the yoke 46. The right clamping arms 402 and 404 consequently move to the left and clamp the box heads against the stationary clamping arms 401 and 403 to the left. Such clamping relation is maintained until the crosshead 41 rises again to permit the spring 418 to shift the bar 415 and the right mounting blocks 406 and 408 with the right clamping arms secured thereto to the right which movement releases the box heads.

To make certain that the side walls or end walls are manually inserted in proper bridging relation on box heads which are seated upon the anvils 101 or 102, flushing members 425 are associated with the two outermost clamping arms 401 and 404. Said flushing members 425 (Figs. 3A and 3B) have beveled forward portions 426 to permit easy insertion of a box side or bottom therebetween and inner flat parallel box engaging portions 427 arranged to flush a box side or bottom in correct bridging relation on a pair of box heads when the right clamping arms 402 and 404 are shifted to the left into box head clamping position as described above. As shown in Figure 12, springs 428 on the outermost clamping arms 401 and 404 normally hold the flushing members 425 in a slightly elevated position but at the same time permit said members 425 to move downwardly when engaged by the nail chucks 45 at the extremity of their descent.

The inner clamp arms 402, 403 (Figs. 3A, 3B and 11) support rollers 429 at their free forward ends for a purpose to become apparent hereinafter.

Side stop arms 430 (Figs. 3A, 3B and 11) are secured on the small shaft 414 rotatably supported in the bearing blocks 413 and extend forwardly between the spaced pairs of clamping arms 401, 402 and 403, 404. Stops 431 are adjustably secured upon said arms 430 in lateral alignment so that a box side may be quickly and yet accurately positioned in fore and aft relation over a pair of box heads on the anvils 101.

Means similar to that disclosed in the Paxton Patent No. 2,232,725, are provided to rotate the stop arm shaft 414 in a counterclockwise direction as viewed in Figure 4 to lower the box side stops 431 when a bottom is to be manually inserted for the second nailing operation. To automatically effect such movement of the box side stops 431 a crown cam 433 (Figs. 3B, 5 and 6) is secured for arcuate adjustment on the upper surface of the uppermost one of the anvil-actuating cam plates 139, previously described. The rotary position of the crown cam 433 on the cam plate 139 is such that prior to the second nailing cycle, it will engage and lift a cam roller 434 (Figs. 1, 4 and 5) mounted on a pivoted cam arm 435 which is normally urged downwardly by a tensile spring 436 (Fig. 4) connected between said arm 435 and the frame of the box making machine. When said roller 434 is lifted and the cam arm 435 is turned, the stop arm shaft 414 is rotated in a counterclockwise direction by linkage generally indicated at 437 (Figs. 2, 5 and 20 to 25) to lower the side stops 431 out of operative position.

Usually the bottoms of the boxes employed in the present operation are of unitary construction so that rigid stops 438 (Figs. 3A, 3B, 4, 8A and 8B) adjustably secured in the innermost mounting blocks 406 and 407 to extend forwardly therefrom are employed to provide for the proper insertion of each bottom. However, in some instances, several boards are inserted in spaced relation to form the box bottom. To provide for the insertion of individual boards in this manner, additional arms 439 (Figs. 3A, 3B, and 4) are operatively associated with the rotatable shaft 414 so as to turn into operative position prior to the second nailing cycle when the box side stop arms 430 are turned downwardly through actuation by the crown cam 433, as hereinabove mentioned. The bottom stop arms 439 are turned on a rod 440 (Fig. 4) secured to the spacer bars 203 and are operatively connected to the rotatable shaft 414 by a suitable resilient linkage, indicated at 441 to provide for the movement into operative position. Stops (not shown) of the type employed on the side stop arms 430 are secured in appropriate and corresponding positions on each of the bottom stop arms 439.

The crown cam 433 which effects movement of the side and bottom stop arms 430 and 439 prior to the second nailing cycle is also adapted to engage and raise a roller 445 (Fig. 4) secured to and beneath a pivoted arm 446 prior to the third nailing cycle. Said arm 446 is pivoted above the forward I beam 35 of the machine frame A and extends between the anvil units 100 to mount a vertical transverse stop plate 447 (Fig. 5) at its rear extremity for a purpose to become apparent in the following description of the operation of the present embodiment of my invention.

Operation

Assuming that the box making machine and the box head feed unit attached thereto have been adjusted for the production of shallow lug boxes, as previously mentioned, the operator first places the box sides and bottoms in stacks adjacent the front of the box making machine so as to be within easy reach. The box heads are placed within the feed magazines 215 on their edges in juxtaposed relation with the longer dimension of said heads extending vertically, and the weighted rollers 227 are positioned behind the rearmost heads, respectively, in the two feed magazines so that the foremost heads will be urged onto the feed tracks 205 and held in precise vertical disposition against the stop rails 228 (Figs. 2, 4 and 5) and stop plates 237 (Figs. 3A and 3B).

The operator then closes the manual switch 158 to start the motor 157 of the box making machine. He also closes the manual switch 326 (Fig. 10) to place the motor 315 of the box head feed drive mechanism 280 in a condition in which it is energized whenever the starter switch 325 (Figs. 4 and 9) associated with the box discharge conveyor 213 is closed. Since no box has been completed to automatically close the starter switch 325 when discharged on said conveyor 213, the operator must manually depress the switch-actuating lever 340 of the discharge conveyor to initiate the first box head feed operation.

When the lever 340 of the discharge conveyor is manually depressed, the starter switch 325 (Figs. 4 and 9) closes to establish the holding circuit through the relay-actuated switch 349 (Fig. 10) and then opens again immediately. The drive mechanism motor 315 is thus energized through the holding circuit and the feed operation begins.

The drive sprocket 300 (Figs. 4 and 16) rotates to cause forward movement of the pusher rods 230 (Figs. 13-15) to engage and propel the box heads resting on the feed tracks 205 (Figs. 4 and 5) forwardly therealong. With the slotted plates 229 (Figs. 8A and 8B) on the forward side of the feed magazines 215 properly adjusted, only one box head may move forwardly on each feed track 205.

The box heads continue to be pushed in substantially rectilinear paths on the feed tracks 205 until they engage the guide rails 211 (Fig. 5) and head stop brackets 362 (Fig. 19) whereupon they converge inwardly and move onto the inner anvils 101. The pusher rods 230 follow the rear edges of the box heads during such convergence by way of the engagement of the sides of the box heads with the pusher rod straps 265, as hereinbefore explained. These straps also coact with the spring fingers 266 on the carriage 231 (Figs. 11 and 13), to maintain the box heads pressed against the guide rails 211 and headstop brackets 362 during the convergence, and furthermore provide for the camming action against the pivoted box head stops 360 (Fig. 19), as described in detail hereinbefore.

The forward stroke of the pusher rods 230 is such that the box heads are pushed onto the inner anvils 101 beyond the head stops 360 and subsequently are moved rearwardly into engagement with said stops at 367 (Fig. 19) as the pusher rods 230 reverse their direction of movement. Thus, the correct fore and aft position of the box heads on the inner anvils 101 is obtained, as shown in Fig. 20.

The pusher rods 230 continue to move rearwardly until the cam lobe 351 (Figs. 10 and 21) on the drive shaft 295 engages the roller 352 to open the normally closed stop switch 355. Thereupon, the holding circuit established through the relay-actuated switch 349 is broken and the box head feed motor 315 is stopped.

During the relatively short time required to move the box heads onto the inner anvils 101, the operator has grasped a box side wall so that the same may be placed in bridging relation on the box heads immediately upon their arrival on the anvils 101. The operator merely shoves the side from the front of the machine over the top edges of the box heads into engagement with the box side stops 431 (Fig. 21) on the side stop arms 430 and thus he quickly and accurately positions the side upon the box heads.

While the box heads are being fed to the inner anvils 101, the motor 157 (Fig. 1) of the box making machine has driven the clutch drum 151 idly on the clutch shaft 152 (Fig. 2). Subsequent to the placement of the first side on the box heads, the operator depresses the pedal 159 so that the clutch 150 is engaged and the first nailing cycle is thereby initiated. The nails for the first nailing cycle may be supplied to the nail chucks 45 by a dummy cycle of the nailing mechanism B, or manually if preferred.

The downward movement of the nail punch crosshead 41 and the nail chuck yoke 46 begins and the cam 421 (Figs. 1 and 21) on the crosshead engages the cam block 420 on the axially slidable clamping arm bar 415 to move the right clamping arms 402 and 404 to the left. The box heads are thus clamped between the pairs of clamping arms 401, 402 and 403, 404 and the edges of the box side are positioned flush with the outer sides of the box heads by the flushing members 425 on the outermost clamping arms 401, 404. The descent of the yoke 46 stops when it contacts the manually positioned box side, but the descent of the crosshead 41 continues so that the nails are driven from the chucks 45 by the nail punches 42 into the box parts (Fig. 21) to firmly secure the side to each of the box heads.

The yoke 46 and crosshead 41 then rise upwardly and a fresh supply of nails is delivered to the nail chucks 45 from the nail hopper 51, as has been hereinbefore described.

When the upper limit of movement of the nailing mechanism B is reached, the cam on the crank gear 88 releases the clutch 150 and applies the brake 164 which completes the first nailing cycle.

When the nails have been driven into the box parts and the yoke 46 and crosshead 41 rise sufficiently to release the box heads from the clamping arms 401, 402, 403, 404, the operator again grasps the side of the box and pulls the same toward himself turning it to a vertical position so that the box heads now project rearwardly from the nailed side (Fig. 22). The hereinbefore mentioned rollers 429 (Figs. 3A and 3B) on the forward extremities of the clamp arms 402, 403 help in this manipulation. When the ascent of the nailing mechanism B nears completion, the configuration of the channel 138 in the cam plates 139 (Figs. 6 and 7) causes the anvil units 100 to move inwardly and the crown cam 433 on the upper cam plate 139 turns the side stop arms 430 downwardly out of operative position. Therefore, the operator may place the partially completed box on the outer anvils 102 and slide it rearwardly thereon until the rigid stops 375 (Figs. 6 and 19) at the rear of said anvils are engaged by the box heads.

While turning and inserting the partially completed box in this manner with one hand, the operator grasps a bottom wall from the conveniently placed stack with his other hand and shoves the bottom wall over the box heads until it engages the bottom stops 438 (Fig. 22). The foot pedal 159 is again depressed to initiate the second nailing cycle during which the bottom is secured to the box heads (Fig. 23).

The nailing action is the same as during the first cycle but as the second cycle nears completion and the bottom is grasped by the operator for a second rotation of the partially completed box, the configuration of the channels 138 on the cam plates 139 causes the anvil units 100 to move outwardly so that the inner anvils 101 (Fig. 24) are again disposed in box head supporting position. Additionally, the crown cam 433 on the upper cam plate 139 has sufficiently advanced to permit the return of the side stop arms 430 to their upper and operative position. At about this time, said crown cam 433 engages the roller 445 (Fig. 4) underneath the pivoted arm 446 to raise the transverse stop plate 447 into operative position (Fig. 24).

The edge of the nailed side of the partially completed box engages this stop plate 447 when the rotation of the box by the operator is completed. Thus, this stop plate 447 coacts with the movable box head stops 360 which limit the insertion of the upper portion of the box, to provide for a precise disposition of the box preparatory to the third nailing cycle.

Another box side wall is inserted against the side stops 431 (Fig. 25) and the pedal 159 is depressed to initiate the third and final nailing cycle upon the completion of which the box is finished and ready for discharge from the box making machine.

The operator grasps the last-nailed side and rotates the box substantially 90° and then shoves it through and out of the rear of the box making machine onto the box discharge conveyor 213 substantially in the manner shown in Fig. 20. Since, in accordance with the present invention, the feed tracks 205 are disposed in greater spaced relation than the anvils 101, such discharge of the completed boxes is enabled between the feed tracks onto the conveyor. As the box moves away on the conveyor 213, it depresses the actuating lever 340 (Figs. 4 and 9) for the starter switch 325 to initiate the feed of another pair of box heads, in the manner described.

If it be desired to produce boxes of different dimensions, the box making machine and the box head feed unit may both be adjusted within wide limits to accommodate such production. Since the box making machine proper constitutes no part of the present invention, reference is made to the mentioned patents for a detailed explanation of the adjustments required for handling box parts of various dimensions. The adjustments for the box head feed unit are determined by the adjustments made in the box making machine, as explained in some detail hereinbefore. Generally, the feed tracks 205, magazines 215 and pusher rods 230 are adjusted vertically or laterally to provide, respectively, for the production of boxes of greater width or length. For varying the depth of a box, the drive mechanism 280 is adjusted forwardly or rearwardly on the supporting angle bars 282 to thereby displace the stroke of the pusher rods 230.

While I have illustrated and described a preferred embodiment of the present invention, it will be understood, however, that various changes and modifications may be made in the details thereof without departing from the spirit and scope of the invention as set forth in the appended claims.

Having thus described the invention, what I claim and desire to protect by Letters Patent is as follows:

1. In a box making machine having box part positioning and supporting means, the combination of: mechanism adapted to feed box heads into nailing position upon said box part positioning and supporting means, said mechanism comprising a laterally adjustable feed track terminating adjacent said box part positioning and supporting means in laterally offset relation thereto and adapted to receive and support a box head for advancement therealong, means for advancing said box head along said feed track toward said box part positioning and supporting means, angularly disposed means on said feed track, and means on said box head advancing means for cooperatively acting with said angularly disposed means to guide said box head as the same is advanced from said feed track into nailing position upon said box part positioning and supporting means.

2. In a box making machine having box part positioning and supporting means, the combination of: mechanism adapted to feed box heads into vertically disposed nailing position upon said box part positioning and supporting means, said mechanism comprising a laterally adjustable feed track terminating adjacent said box part positioning and supporting means in laterally offset relation thereto and adapted to receive and support a box head on its edge for advancement therealong, means for advancing said box head along said feed track toward said box part positioning and supporting means, angularly adjustable means on said feed track, and means on said box head advancing means for cooperatively acting with said angularly adjustble means to maintain vertical disposition of said box head as the same is advanced from said feed track into nailing position upon said box part positioning and supporting means.

3. In a box making machine having a box part positioning and supporting means, the combination of: mechanism adapted to feed box heads into vertically disposed nailing position upon said box part positioning and supporting means, said mechanism comprising a feed track terminating adjacent said box part positioning and supporting means and adapted to receive and support a box head on its edge, means for advancing said box head on said feed track toward said box part positioning and supporting means, guide means on said feed track positioned to engage one side of said box head as it is advanced therealong, and resilient means on said box head advancing means adapted to engage the other side of said box head and maintain the latter against said guide means in vertical disposition on said feed track as the box head is advanced therealong into nailing position upon said box part positioning and supporting means.

4. In a box making machine having box part positioning and supporting means, the combination of: mechanism adapted to feed box heads into nailing position upon said box part positioning and supporting means, said mechanism comprising a feed track terminating adjacent said box part positioning and supporting means and adapted to receive and support a box head thereon, means for advancing said box head along said feed track into nailing position upon said box part positioning and supporting means, and stop means pivotally supported and resiliently urged to normally extend into the path of the box head advancing into the box making machine, said stop means being arranged to move from its position in said box head path when engaged by the box head and to return to said position in the box head path subsequent to the advancement of the box head into nailing position upon said box part positioning and supporting means to thus preclude rearward movement of said box head from said nailing position.

5. In a box making machine having a box part positioning and supporting means, the combination of: mechanism adapted to feed box heads into vertically disposed nailing position upon said box part positioning and supporting means, said mechanism comprising a laterally and vertically adjustable feed track terminating adjacent said box part positioning and supporting means in laterally offset relation thereto and adapted to receive and support a box head on its edge, means for successively supplying box heads to said feed track including a downwardly inclined, laterally disposed, magazine adapted to support a plurality of box heads on their edges in successive abutting relation whereby the lowermost box head is urged by gravity onto said feed track in vertical disposition thereon, means for advancing said lowermost box head along said feed track toward and onto said box part positioning and supporting means, and adjustable means on said magazine to permit release of only the lowermost box head therefrom for advancement along said feed track toward said box part positioning and supporting means.

6. In a box making machine having vertically disposed, spaced parallel, box part positioning and supporting units, the combination of: mechanism adapted to feed box heads into vertically disposed nailing position upon said box part positioning and supporting units, said mechanism comprising a pair of spaced parallel feed tracks terminating adjacent said units and adapted to receive and support a pair of box heads on their edges, said fed tracks being positioned in greater spaced relation than said units to permit the passage between said feed tracks of completed boxes produced in said box making machine, means for advancing box heads on said feed tracks toward said box part positioning and supporting units, and guide means on said feed tracks adjacent said units to cause the box heads to move in convergent paths as they approach and pass onto said box part positioning and supporting units.

7. In a box making machine having spaced parallel box part positioning and supporting units, the combination of: a mechanism adapted to feed box heads into nailing position upon said box part positioning and supporting units, said mechanism comprising a pair of spaced parallel feed tracks terminating adjacent said box part positioning and supporting units and adapted to receive and support a pair of box heads on their edges, said feed tracks being positioned in greater spaced relation than said box part positioning and supporting units to permit the rearward passage between said feed tracks of completed boxes produced in the box making machine, means for advancing said pair of box heads on their respective feed tracks toward their respective box part positioning and supporting units, and angularly disposed guide means on said feed tracks adjacent said box part positioning and supporting units to cause the box heads to move in convergent paths as they approach and move onto said units.

8. In a box making machine having vertically disposed spaced parallel, box part positioning and supporting units, the combination of: mechanism adapted to feed box heads into vertically disposed nailing position upon said box part positioning and supporting units, said mechanism comprising a pair of spaced parallel feed tracks terminating adjacent said box part positioning and supporting units and adapted to receive and support a pair of box heads on their edges, said tracks being positioned in greater spaced relation than said box part positioning and supporting units to permit rearward passage between said feed tracks of completed boxes produced in said box making machine, means including yieldable box head engaging members for advancing box heads along said feed tracks toward said box part positioning and supporting units, and means on said feed tracks having functional relationship with said yieldable box head engaging members on said box head advancing means for cooperatively acting to maintain vertical disposition of said box heads as the same are advanced into nailing position upon said box part positioning and supporting units.

9. In a box making machine having vertically disposed, spaced parallel, anvil units, the combination of: box head feeding mechanism mounted upon the rear of said box making machine and adapted to feed box heads forwardly into vertically disposed nailing position upon said anvil units, said mechanism comprising a pair of spaced parallel feed tracks terminating adjacent said anvil units and adapted to receive and support a pair of box heads on their edges, said tracks being positioned in greater spaced relation than said anvil units to permit rearward passage between said feed tracks of completed boxes produced in said box making machine, means for advancing box heads forwardly along said feed tracks toward said anvil units, guide means on said feed tracks positioned to engage the outer sides of the box heads advanced therealong, and resilient means on said box head advancing means adapted to engage the inner sides of said box heads and maintain the same against said guide means in vertical disposition on their respective feed tracks as they are advanced thereon into nailing position on said anvil units.

10. In a box making machine having spaced parallel anvil units, the combination of: box head feeding mechanism adapted to feed box heads into nailing position upon said anvil units, said mechanism comprising a pair of spaced parallel feed tracks terminating adjacent said anvil units and adapted to receive and support a pair of box heads on their edges, said feed tracks being positioned in greater spaced relation than said anvil units to permit the rearward passage between said feed tracks of completed boxes produced in the box making machine, means for advancing box heads along said feed tracks into nailing position upon said anvil units, and stop members pivotally supported and resiliently urged to normally extend into the paths of the box heads advancing along said feed tracks, said stop members being arranged to move from positions in said box head paths when engaged by the advancing box heads and to return to said positions in the box head paths subsequent to the advancement of the box heads into nailing position upon said anvil units to thus prevent rearward movement of said box heads from said nailing position.

11. In a box making machine having vertically disposed, spaced parallel, anvil units, the combination of: box head feeding mechanism mounted upon the rear of said box making machine and adapted to feed box heads forwardly into vertically disposed nailing position upon said anvil units, said mechanism comprising a pair of laterally adjustable, spaced parallel, feed tracks terminating adjacent said anvil units in laterally offset relation thereto and adapted to receive and support a pair of box heads on their edges, said feed tracks being positioned in greater spaced relation than said anvil units to permit the rearward passage between said feed tracks of completed boxes produced in the box making machine, means for successively supplying box heads to said feed tracks including downwardly inclined, laterally disposed, magazines adapted to support pluralities of box heads on their edges in successive abutting relation whereby the lowermost box heads of said magazines are urged by gravity onto said feed tracks in vertical disposition thereon, means for advancing said lowermost box heads along said feed tracks toward said anvil units, and adjustable means on said magazines to permit release of only the lowermost box heads therefrom for advancement toward said anvil units.

12. In a box making machine, the combination of: mechanism adapted to feed box heads into nailing position in said box making machine and to receive and convey from the latter in a direction opposite to the box head feed of the mechanism completed boxes manually presented thereto after they have been nailed by said box making machine, said mechanism comprising a pair of feed tracks terminating adjacent the box making machine and adapted to receive and support a pair of box heads for advancement therealong, means for advancing said box heads along said feed tracks toward and into nailing position in said box making machine, a box discharge conveyor having its box receiving end disposed adjacent said box making machine and arranged to receive completed boxes manually presented thereto after their production in said box making machine, and means operable by each completed box as it travels along said discharge conveyor to activate said box head advancing means.

13. In a box making machine, the combination of: mechanism adapted to feed box heads into nailing position in said box making machine and to receive and convey from the latter in a direction opposite to the box head feed of said mechanism completed boxes manually presented thereto after they have been nailed by said box making machine, said mechanism comprising a pair of feed tracks terminating adjacent the box making machine and adapted to receive and support a pair of box heads for advancement therealong, means for advancing said box heads along said feed tracks toward and into nailing position in said box making machine, a box discharge conveyor disposed below the plane of said feed tracks in substantially co-extensive relation therewith and arranged to receive completed boxes manually presented thereto after their production in said box making machine, and means operable by each completed box as it travels along said discharge conveyor to activate said box head advancing means.

14. In a box making machine, the combination of: mechanism adapted to feed box heads into nailing position in said box making machine and to receive and convey therefrom in a direction opposite to the box head feed of said mechanism completed boxes manually presented to the latter after they have been nailed by said box making machine, said mechanism comprising a pair of feed tracks terminating adjacent the box making machine and adapted to receive and support a pair of box heads for advancement therealong, means for advancing said box heads along said feed tracks toward and into nailing position in said box making machine, a box discharge conveyor having its box receiving end disposed adjacent said box making machine and arranged to receive completed boxes manually presented thereto after their production in said box making machine, means operable by each completed box as it travels along said discharge conveyor to activate said box head advancing means, and means operable upon movement of said box head advancing means to a predetermined position from said box making machine to de-activate and stop said box head advancing means.

15. In a box making machine, the combination of: mechanism adapted to feed box heads into nailing position in said box making machine and to receive and convey therefrom in a direction opposite to the box head feed of said mechanism completed boxes manually presented to the latter after they have been nailed by said box making machine, said mechanism comprising a pair of feed tracks terminating adjacent the box making machine and adapted to receive and support a pair of box heads for advancement therealong, means for successively supplying box heads to said feed tracks, means for advancing pairs of box heads along said feed tracks toward and into nailing position in said box making machine, a box discharge conveyor having its box receiving end disposed adjacent said box making machine and arranged to receive completed boxes manually presented thereto after their production in said box making machine, and means operable by each completed box as it travels along said discharge conveyor to activate said box head advancing means in timed relation with the placement of a completed box upon said discharge conveyor.

16. In a box making machine, the combination of: mechanism adapted to feed box heads into nailing position in said box making machine and to receive and convey therefrom completed boxes manually presented to said mechanism after they have been nailed by said box making machine, said mechanism comprising a pair of feed tracks terminating adjacent the box making machine and adapted to successively receive and support pairs of box heads for advancement therealong, cyclically operable means for advancing said pairs of box heads along said feed tracks toward and into nailing position in said box making machine, a box discharge conveyor having its box receiving end disposed adjacent the box making machine and arranged to receive completed boxes manually presented thereto after their production in said box making machine, and means operable by each completed box as it travels along said discharge conveyor to activate said cyclically operable box head advancing means.

17. In a box making machine, the combination of: mechanism adapted to feed box heads into nailing position in said box making machine and to receive and convey therefrom completed boxes manually presented to said mechanism after they have been nailed by said box making machine, said mechanism comprising a support frame including two sets of longitudinally disposed guide rails and a similarly disposed pair of feed tracks all terminating adjacent said box making machine, said feed tracks being adapted to successively receive and support pairs of box heads for advancement therealong, a self-contained power unit mounted for longitudinal adjustment upon one set of said guide rails and including a planetary operated crank, a box head feed carriage mounted for reciprocative movement upon the other set of said guide rails and adapted to be operatively connected to said crank for reciprocation thereby, said box head feed carriage having means for engaging and advancing pairs of box heads along said feed tracks toward and into nailing position in said box making machine, a box discharge conveyor having its box receiving end disposed adjacent the box making machine and arranged to receive completed boxes manually presented thereto after their production in said box making machine, and means operable by each completed box as it travels along said discharge conveyor to activate said self-contained power unit.

18. In a box making machine, the combination of: mechanism adapted to feed box heads into nailing position in said box making machine, said mechanism comprising a support frame including two sets of longitudinally disposed guide rails and a similarly disposed pair of feed tracks all terminating adjacent said box making machine, said feed tracks being adapted to successively receive and support pairs of box heads for advancement therealong, a self-contained power unit mounted for longitudinal adjustment upon one set of said guide rails, and a box head feed carriage mounted for reciprocative movement upon the other set of said guide rails and adapted to be operatively connected to said power unit for reciprocation thereby, said box head feed carriage having means for engaging and advancing pairs of box heads along said feed tracks towards and into nailing position in said box making machine.

19. In a box making machine, the combination of: mechanism adapted to feed box heads into nailing position in said box making machine, said mechanism comprising a longitudinally disposed support frame adapted for attachment to said box making machine and including a pair of upper guide rails, a pair of lower guide rails, and a pair of feed tracks all terminating adjacent said box making machine, said feed tracks being adapted to successively receive and support pairs of box heads for advancement therealong, a self-contained power unit mounted for longitudinal adjustment upon said upper pair of guide rails and adapted to be secured in selected positions thereon, said power unit including a planetary operated crank, and a box head feed carriage mounted for reciprocative movement upon said lower pair of guide rails and adapted to be operatively connected to said crank for reciprocation thereby, said box head feed carriage having means for engaging and advancing pairs of box heads along said feed tracks towards and into nailing position in said box making machine.

20. In a box making machine having vertically disposed, spaced parallel, anvil units, the combination of: mechanism adapted to feed box heads into vertically disposed nailing position upon said anvil units and to receive and convey from said box making machine completed boxes manually presented to the conveying means of said mechanism after they have been nailed by said box making machine, said mechanism comprising a pair of spaced parallel feed tracks terminating adjacent said anvil units and adapted to receive and support a pair of box heads on their edges, said tracks being positioned in greater spaced relation than said anvil units to permit passage between said feed tracks of completed boxes produced in said box making machine, means for successively supplying box heads to said feed tracks for advancement therealong, cyclically operable means for advancing box heads on said feed tracks toward and into nailing position upon said anvil units, guide means on said feed tracks adjacent said anvil means to cause the box heads to move in convergent paths as they approach and pass onto said anvil units, a box discharge conveyor having its box receiving end disposed adjacent the front of said box making machine and arranged to receive completed boxes manually presented thereto after their production in said box making machine, and means operable by each completed box as it travels along said discharge conveyor to activate said cyclically operable box head advancing means.

21. In a box making machine having vertically disposed, spaced parallel, anvil units, the combination of: mechanism adapted to feed box heads into vertically disposed nailing position upon said anvil units and to receive and convey from said box making machine completed boxes manually presented to the conveying means of said mechanism after they have been nailed by said box making machine, said mechanism comprising a pair of spaced parallel feed tracks terminating adjacent said anvil units and adapted to receive and support a pair of box heads on their edges, said feed tracks being positioned in greater spaced relation than said anvil units to permit passage between said feed tracks of completed boxes produced in the box making machine, means for successively supply box heads to said feed tracks including downwardly inclined, laterally disposed, magazines each adapted to support a plurality of box heads on their edges in successive abutting relation whereby the lowermost box head is urged by gravity onto a respective one of said feed tracks for advancement therealong, means reciprocably movable longitudinally of said feed tracks for advancing box heads on said feed tracks toward and into nailing position on said anvil units, guide means on said feed tracks adjacent said anvil units to cause the box heads to move in convergent paths as they approach and pass onto said anvil units, a box discharge conveyor having the receiving end thereof disposed adjacent the front of said box making machine and arranged to receive completed boxes manually presented thereto after their production in said box making machine, and means operable by each completed box as it travels along said discharge conveyor to activate said reciprocable box head advancing means.

22. In a box making machine having vertically disposed, spaced parallel anvil units, the combination of: mechanism adapted to feed box heads into vertically disposed nailing position upon said anvil units and to receive and convey from said box making machine completed boxes manually presented to the conveying means of said mechanism after they have been nailed by said box making machine, said mechanism comprising a pair of spaced parallel feed tracks terminating adjacent said anvil units and adapted to receive and support a pair of box heads on their edges, said feed tracks being positioned in greater spaced relation than said anvil units to permit passage between said feed tracks of a completed box produced in said box making machine, means for successively supplying box heads to said feed tracks including downwardly inclined, laterally disposed, magazines each adapted to support a plurality of box heads on their edges in successive abutting relation whereby the lowermost box head is urged by gravity onto a respective one of said feed tracks for advancement therealong, means reciprocably movable longitudinally of said tracks for advancing box heads on said feed tracks toward and into nailing position on said anvil units, guide means on said feed tracks adjacent said anvil units to cause the box heads to move in convergent paths as they approach and pass onto said anvil units, a box discharge conveyor having the receiving end thereof disposed adjacent the front end of said box-making machine and arranged to receive completed boxes manually presented thereto after their production in said box making machine, means operable by each completed box as it travels along said discharge conveyor to activate said reciprocable box head advancing means, and means operable upon movement of said reciprocable box head advancing means to a predetermined position from the box making machine to deactivate and stop said reciprocable means.

23. The combination with a box making machine, of an attachable box head feed unit adapted to automatically feed box heads forwardly into nailing position in said box making machine and to receive and convey rearwardly therefrom completed boxes manually presented to said feed unit after they have been nailed by said box making machine, said feed unit including attaching means for connecting the unit to the rear of the box making machine, power means supported from said attaching means for advancing box heads into nailing position in said box making machine, and means supported from said attaching means and disposed adjacent and to the rear of said nailing position for conveying from the box making machine completed boxes manually transferred from said nailing position to the conveying means.

24. The combination with a box making machine, of a box head feed unit arranged to be attached to the rear of said box making machine and adapted to automatically feed box heads forwardly into nailing position in the box making machine and to receive and convey rearwardly from the same completed boxes manually presented to said feed unit after they have been nailed by said box making machine, said feed unit including attaching means for connecting the unit to the rear of the box making machine, means supported from the attaching means and defining laterally spaced tracks for guiding the box heads from the rear of the box making machine forwardly into nailing position in the same, power actuated means supported from the attaching means for advancing box heads forwardly along said tracks, and means for conveying completed boxes from the box making machine, said conveying means being supported from the attaching means and arranged in a position adjacent and to the rear of said nailing position to adapt the conveying means to receive completed boxes transferred manually from said nailing position and between said tracks to the conveying means.

25. The combination with a hand-fed box making machine, of an attachable box head feed unit adapted to automatically feed box heads into nailing position in said box making machine while concurrently receiving and conveying therefrom completed boxes manually presented to said feed unit after they have been nailed by the box making machine, said feed unit including power actuated means for successively advancing box heads into nailing position in said box making machine, box conveying means adapted to receive completed boxes manually presented thereto after their production in the box making machine and to convey said boxes away from the latter, and means operable by each completed box as it travels along said conveying means adapted to concurrently activate said power actuated box head advancing means.

26. The combination with a hand-fed box making machine, of an attachable box head feed unit adapted to automatically feed box heads into nailing position in said box making machine while concurrently receiving and conveying therefrom completed boxes manually presented to said feed unit after they have been nailed by the box making machine, said feed unit including power actuated means for successively advancing box heads into nailing position in said box making machine, box conveying means adapted to receive completed boxes manually presented thereto after their production in the box making machine and to convey said boxes away from the latter, means operable by each completed box as it travels along said conveying means adapted to concurrently activate said power actuated box head advancing means, and means operable upon movement of said box head advancing means to a predetermined position from the box making machine to deactivate and stop said advancing means.

27. A box making machine having vertically disposed, spaced, parallel, box part positioning and supporting units, comprising mechanism adapted to feed box heads into vertically disposed nailing position upon said box part positioning and supporting units, said mechanism including a pair of spaced parallel feed tracks terminating adjacent said units and adapted to receive and support a pair of box heads on their edges, said feed tracks being positioned in greater spaced relation than said units to permit rearward passage between said feed tracks of completed boxes produced in said box making machine, means for advancing box heads on said feed tracks toward said box part positioning and supporting units, and means on said feed tracks adjacent said units to cause the box heads to move along predetermined paths as they approach and pass onto said box part positioning and supporting units.

28. A box making machine having spaced parallel, box part positioning and supporting units, comprising mechanism adapted to feed box heads into nailing position upon said box part positioning and supporting units, said mechanism including a pair of spaced parallel feed tracks terminating adjacent said units and adapted to receive and support a pair of box heads, said feed tracks being positioned in greater spaced relation than said units to permit rearward passage between said feed tracks of completed boxes produced in said box making machine, and means for advancing box heads along said feed tracks toward and onto said box part positioning and supporting units.

29. A box making machine comprising mechanism adapted to feed box heads forwardly into nailing position in said box making machine and to effect discharge of completed boxes rearwardly from the machine, said mechanism including a pair of feed tracks terminating substantially adjacent the box making machine and adapted to receive and support a pair of box heads for advancement therealong, means for advancing said box heads along said feed tracks toward and into nailing position in said box making machine, means for energizing said box head advancing means, and means depending from said box head feed mechanism and operably disposed in the median plane of same for effecting removal of said completed boxes rearwardly from said box making machine.

30. A box making machine comprising mechanism adapted to feed box heads into nailing position in said box making machine and to receive and convey therefrom in a direction opposite to the box head feed of said mechanism completed boxes manually presented to the latter after they have been nailed by said box making machine, said mechanism including a pair of feed tracks adapted to receive and support a pair of box heads for advancement therealong, means for mounting the tracks in position terminating adjacent said nailing position in the nailing machine, means for advancing said box heads along said feed tracks toward and into said nailing position, means for activating said box head advancing means, means operable upon movement of said box head advancing means to a predetermined distance from said box making machine to de-activate and stop said box head advancing means, and means supported from said mounting means adjacent said nailing position for effecting removal of said completed boxes rearwardly from said machine.

31. In a box making machine having spaced parallel anvil units, mechanism adapted to feed box heads into nailing position upon said anvil units and to receive and convey rearwardly from the box making machine completed boxes after they have been nailed by said machine, said mechanism comprising a pair of spaced parallel feed tracks terminating adjacent said anvil units and adapted to receive and support a pair of box heads, said tracks being positioned in greater spaced relation than said anvil units to permit rearward passage between said feed tracks of completed boxes produced in said box making machine, means for successively supplying box heads to said feed tracks for advancement therealong, means for advancing box heads on said feed tracks toward and into nailing position upon said anvil units, means for activating said advancing means, and means operably associated with said box making machine and said box head feeding mechanism and disposed substantially in aligned relation with the common median plane of said machine and mechanism to thereby effect removal of said completed boxes rearwardly from said machine.

References Cited in the file of this patent

UNITED STATES PATENTS

| Number | Name | Date |
|---|---|---|
| 344,419 | Swift | June 29, 1886 |
| 647,992 | Schanck | Apr. 24, 1900 |
| 1,058,894 | Northrup | Apr. 15, 1913 |
| 1,144,497 | Northrup | June 29, 1915 |
| 1,448,412 | Lundholm | Mar. 13, 1923 |
| 1,506,941 | Parker | Sept. 2, 1924 |
| 1,897,140 | Perez | Feb. 14, 1933 |
| 2,464,214 | Cochran | Mar. 15, 1949 |